(12) United States Patent
Knapp et al.

(10) Patent No.: US 11,915,581 B2
(45) Date of Patent: Feb. 27, 2024

(54) VISIBLE LIGHT COMMUNICATION SYSTEM AND METHOD

(71) Applicant: Lutron Technology Company, LLC, Coopersburg, PA (US)

(72) Inventors: David J. Knapp, Austin, TX (US); Horace C. Ho, Austin, TX (US)

(73) Assignee: Lutron Technology Company, LLC, Coopersburg, PA (US)

( * ) Notice: Subject to any disclaimer, the term of this patent is extended or adjusted under 35 U.S.C. 154(b) by 167 days.

(21) Appl. No.: 17/558,678

(22) Filed: Dec. 22, 2021

(65) Prior Publication Data

US 2022/0114884 A1  Apr. 14, 2022

Related U.S. Application Data

(63) Continuation of application No. 17/102,369, filed on Nov. 23, 2020, now Pat. No. 11,210,934, which is a
(Continued)

(51) Int. Cl.
*G08C 23/04* (2006.01)
*H04B 10/116* (2013.01)
(Continued)

(52) U.S. Cl.
CPC .......... *G08C 23/04* (2013.01); *H04B 10/116* (2013.01); *H04L 12/282* (2013.01);
(Continued)

(58) Field of Classification Search
None
See application file for complete search history.

(56) References Cited

U.S. PATENT DOCUMENTS

| 4,029,976 A | 6/1977 | Fish et al. |
| 4,206,444 A | 6/1980 | Ferlan |

(Continued)

FOREIGN PATENT DOCUMENTS

| CN | 1291282 A | 4/2001 |
| CN | 1396616 A | 2/2003 |

(Continued)

OTHER PUBLICATIONS

"Color Management of a Red, Green, and Blue LED Combinational Light Source", Avago Technologies, Mar. 2010, 2 pages.
(Continued)

*Primary Examiner* — David W Lambert
(74) *Attorney, Agent, or Firm* — Condo Roccia Koptiw LLP

(57) ABSTRACT

A system and method are provided herein for communicating with and controlling various devices using visible light communication (VLC). According to one embodiment, a method is provided for extending a communication range of a VLC system comprising a plurality of controlled devices and a remote-control device. Such a method may include, for example, transmitting a communication message from a remote-control device to a first controlled device located within range of the remote-control device, wherein the communication message is transmitted through free space using visible light, and extending the communication range of the VLC system to a second controlled device, which is located outside of the range of the remote-control device, by using the first controlled device to retransmit the communication message through free space using visible light to the second controlled device.

14 Claims, 10 Drawing Sheets

Related U.S. Application Data continuation of application No. 15/953,202, filed on Apr. 13, 2018, now Pat. No. 10,847,026, which is a continuation of application No. 13/773,322, filed on Feb. 21, 2013, now Pat. No. 10,210,750, which is a continuation-in-part of application No. 13/231,077, filed on Sep. 13, 2011, now abandoned.

(60) Provisional application No. 61/601,153, filed on Feb. 21, 2012.

(51) Int. Cl.
  H04L 12/28 (2006.01)
  H04L 12/64 (2006.01)
  H05B 47/195 (2020.01)

(52) U.S. Cl.
  CPC ...... *H04L 12/2838* (2013.01); *H04L 12/6418* (2013.01); *H05B 47/195* (2020.01); *G08C 2201/93* (2013.01); *H04L 2012/2841* (2013.01); *H04L 2012/285* (2013.01)

(56) References Cited

U.S. PATENT DOCUMENTS

| | | | |
|---|---|---|---|
| 4,402,090 A | 8/1983 | Gfeller et al. |
| 4,713,841 A | 12/1987 | Porter et al. |
| 4,745,402 A | 5/1988 | Auerbach |
| 4,809,359 A | 2/1989 | Dockery |
| 5,018,057 A | 5/1991 | Biggs et al. |
| 5,093,744 A | 3/1992 | Sato et al. |
| 5,103,466 A | 4/1992 | Bazes |
| 5,181,015 A | 1/1993 | Marshall et al. |
| 5,193,201 A | 3/1993 | Tymes |
| 5,218,356 A | 6/1993 | Knapp |
| 5,299,046 A | 3/1994 | Spaeth et al. |
| 5,317,441 A | 5/1994 | Sidman |
| 5,383,044 A | 1/1995 | Borchardt et al. |
| 5,541,759 A | 7/1996 | Neff et al. |
| 5,619,262 A | 4/1997 | Uno |
| 5,657,145 A | 8/1997 | Smith |
| 5,797,085 A | 8/1998 | Beuk et al. |
| 5,905,445 A | 5/1999 | Gurney et al. |
| 5,929,845 A | 7/1999 | Wei et al. |
| 6,016,038 A | 1/2000 | Mueller et al. |
| 6,067,595 A | 5/2000 | Lindenstruth |
| 6,069,929 A | 5/2000 | Yabe et al. |
| 6,084,231 A | 7/2000 | Popat |
| 6,094,014 A | 7/2000 | Bucks et al. |
| 6,094,340 A | 7/2000 | Min |
| 6,108,114 A | 8/2000 | Gilliland et al. |
| 6,127,783 A | 10/2000 | Pashley et al. |
| 6,147,458 A | 11/2000 | Bucks et al. |
| 6,150,774 A | 11/2000 | Mueller et al. |
| 6,234,645 B1 | 5/2001 | Boerner et al. |
| 6,234,648 B1 | 5/2001 | Boerner et al. |
| 6,250,774 B1 | 6/2001 | Begemann et al. |
| 6,333,605 B1 | 12/2001 | Grouev et al. |
| 6,344,641 B1 | 2/2002 | Blalock et al. |
| 6,356,774 B1 | 3/2002 | Bernstein et al. |
| 6,359,712 B1 | 3/2002 | Kamitani |
| 6,384,545 B1 | 5/2002 | Lau |
| 6,396,815 B1 | 5/2002 | Greaves et al. |
| 6,414,661 B1 | 7/2002 | Shen et al. |
| 6,441,558 B1 | 8/2002 | Muthu et al. |
| 6,448,550 B1 | 9/2002 | Nishimura |
| 6,495,964 B1 | 12/2002 | Muthu et al. |
| 6,498,440 B2 | 12/2002 | Stam et al. |
| 6,513,949 B1 | 2/2003 | Marshall et al. |
| 6,577,512 B2 | 6/2003 | Tripathi et al. |
| 6,617,795 B2 | 9/2003 | Bruning |
| 6,636,003 B2 | 10/2003 | Rahm et al. |
| 6,639,574 B2 | 10/2003 | Scheibe |
| 6,664,744 B2 | 12/2003 | Dietz |
| 6,692,136 B2 | 2/2004 | Marshall et al. |
| 6,741,351 B2 | 5/2004 | Marshall et al. |
| 6,753,661 B2 | 6/2004 | Muthu et al. |
| 6,788,011 B2 | 9/2004 | Mueller et al. |
| 6,806,659 B1 | 10/2004 | Mueller et al. |
| 6,831,569 B2 | 12/2004 | Wang et al. |
| 6,831,626 B2 | 12/2004 | Nakamura et al. |
| 6,853,150 B2 | 2/2005 | Clauberg et al. |
| 6,879,263 B2 | 4/2005 | Pederson et al. |
| 6,965,205 B2 | 11/2005 | Piepgras et al. |
| 6,969,954 B2 | 11/2005 | Lys |
| 6,975,079 B2 | 12/2005 | Lys et al. |
| 7,006,768 B1 | 2/2006 | Franklin |
| 7,014,336 B1 | 3/2006 | Ducharme et al. |
| 7,038,399 B2 | 5/2006 | Lys et al. |
| 7,046,160 B2 | 5/2006 | Pederson et al. |
| 7,072,587 B2 | 7/2006 | Dietz et al. |
| 7,088,031 B2 | 8/2006 | Brantner et al. |
| 7,119,500 B2 | 10/2006 | Young |
| 7,135,824 B2 | 11/2006 | Lys et al. |
| 7,161,311 B2 | 1/2007 | Mueller et al. |
| 7,166,966 B2 | 1/2007 | Naugler, Jr. et al. |
| 7,194,209 B1 | 3/2007 | Robbins et al. |
| 7,233,115 B2 | 6/2007 | Lys |
| 7,233,831 B2 | 6/2007 | Blackwell |
| 7,252,408 B2 | 8/2007 | Mazzochette et al. |
| 7,255,458 B2 | 8/2007 | Ashdown |
| 7,256,554 B2 | 8/2007 | Lys |
| 7,262,559 B2 | 8/2007 | Tripathi et al. |
| 7,294,816 B2 | 11/2007 | Ng et al. |
| 7,315,139 B1 | 1/2008 | Selvan et al. |
| 7,319,298 B2 | 1/2008 | Jungwirth et al. |
| 7,329,998 B2 | 2/2008 | Jungwirth |
| 7,330,002 B2 | 2/2008 | Joung |
| 7,330,662 B2 | 2/2008 | Zimmerman |
| 7,339,332 B2 | 3/2008 | Cull et al. |
| 7,352,972 B2 | 4/2008 | Franklin |
| 7,358,706 B2 | 4/2008 | Lys |
| 7,359,640 B2 | 4/2008 | Onde et al. |
| 7,362,320 B2 | 4/2008 | Payne et al. |
| 7,372,859 B2 | 5/2008 | Hall et al. |
| 7,400,310 B2 | 7/2008 | Lemay |
| 7,445,340 B2 | 11/2008 | Conner et al. |
| 7,510,300 B2 | 3/2009 | Iwauchi et al. |
| 7,511,695 B2 | 3/2009 | Furukawa et al. |
| 7,525,611 B2 | 4/2009 | Zagar et al. |
| 7,553,033 B2 | 6/2009 | Seki |
| 7,554,514 B2 | 6/2009 | Nozawa |
| 7,573,210 B2 | 8/2009 | Ashdown et al. |
| 7,583,901 B2 | 9/2009 | Nakagawa et al. |
| 7,606,451 B2 | 10/2009 | Morita |
| 7,607,798 B2 | 10/2009 | Panotopoulos |
| 7,619,193 B2 | 11/2009 | Deurenberg |
| 7,649,527 B2 | 1/2010 | Cho et al. |
| 7,659,672 B2 | 2/2010 | Yang |
| 7,683,864 B2 | 3/2010 | Lee et al. |
| 7,701,151 B2 | 4/2010 | Petrucci et al. |
| 7,705,541 B2 | 4/2010 | Watanabe et al. |
| 7,737,936 B2 | 6/2010 | Daly |
| 7,828,479 B1 | 11/2010 | Aslan et al. |
| 7,851,737 B2 | 12/2010 | Crouse et al. |
| 7,878,488 B1 | 2/2011 | Leason |
| 7,885,548 B1 | 2/2011 | Nelson et al. |
| 7,924,243 B2 | 4/2011 | Kanai et al. |
| 8,013,538 B2 | 9/2011 | Zampini et al. |
| 8,018,135 B2 | 9/2011 | Van De Ven et al. |
| 8,035,603 B2 | 10/2011 | Furukawa et al. |
| 8,040,299 B2 | 10/2011 | Kretz et al. |
| 8,044,899 B2 | 10/2011 | Ng et al. |
| 8,044,918 B2 | 10/2011 | Choi |
| 8,057,072 B2 | 11/2011 | Takenaka et al. |
| 8,075,182 B2 | 12/2011 | Dai et al. |
| 8,076,869 B2 | 12/2011 | Shatford et al. |
| 8,159,150 B2 | 4/2012 | Ashdown et al. |
| 8,174,197 B2 | 5/2012 | Ghanem et al. |
| 8,174,205 B2 | 5/2012 | Myers et al. |
| 8,283,876 B2 | 10/2012 | Ji |
| 8,299,722 B2 | 10/2012 | Melanson |
| 8,362,707 B2 | 1/2013 | Draper et al. |
| 8,471,496 B2 | 6/2013 | Knapp |

(56) References Cited

U.S. PATENT DOCUMENTS

| | | |
|---|---|---|
| 8,503,886 B1 | 8/2013 | Gunasekara et al. |
| 8,521,035 B2 | 8/2013 | Knapp et al. |
| 8,556,438 B2 | 10/2013 | Lee et al. |
| 8,569,974 B2 | 10/2013 | Chobot |
| 8,595,748 B1 | 11/2013 | Haggerty et al. |
| 8,633,655 B2 | 1/2014 | Kao et al. |
| 8,653,758 B2 | 2/2014 | Radermacher et al. |
| 8,680,787 B2 | 3/2014 | Veskovic |
| 8,704,666 B2 | 4/2014 | Baker, Jr. |
| 8,721,115 B2 | 5/2014 | Ing et al. |
| 8,749,172 B2 | 6/2014 | Knapp |
| 8,773,032 B2 | 7/2014 | May et al. |
| 8,791,647 B2 | 7/2014 | Kesterson et al. |
| 8,816,600 B2 | 8/2014 | Elder |
| 8,886,045 B2 | 11/2014 | Pederson et al. |
| 8,886,047 B2 | 11/2014 | Knapp |
| 8,911,160 B2 | 12/2014 | Seo et al. |
| 9,386,668 B2 | 7/2016 | Knapp et al. |
| 9,509,525 B2 | 11/2016 | Knapp |
| 9,848,482 B2 | 12/2017 | Knapp |
| 10,210,750 B2 | 2/2019 | Knapp et al. |
| 10,847,026 B2 | 11/2020 | Knapp et al. |
| 2001/0020123 A1 | 9/2001 | Diab et al. |
| 2001/0030668 A1 | 10/2001 | Erten et al. |
| 2002/0014643 A1 | 2/2002 | Kubo et al. |
| 2002/0033981 A1 | 3/2002 | Keller et al. |
| 2002/0047624 A1 | 4/2002 | Stam et al. |
| 2002/0049933 A1 | 4/2002 | Nyu |
| 2002/0134908 A1 | 9/2002 | Johnson |
| 2002/0138850 A1 | 9/2002 | Basil et al. |
| 2002/0171608 A1 | 11/2002 | Kanai et al. |
| 2003/0103413 A1 | 6/2003 | Jacobi et al. |
| 2003/0122749 A1 | 7/2003 | Booth et al. |
| 2003/0133491 A1 | 7/2003 | Shih |
| 2003/0179721 A1 | 9/2003 | Shurmantine et al. |
| 2003/0234342 A1 | 12/2003 | Gaines et al. |
| 2004/0044709 A1 | 3/2004 | Cabrera et al. |
| 2004/0052076 A1 | 3/2004 | Mueller et al. |
| 2004/0052299 A1 | 3/2004 | Jay et al. |
| 2004/0101312 A1 | 5/2004 | Cabrera |
| 2004/0136682 A1 | 7/2004 | Watanabe |
| 2004/0201793 A1 | 10/2004 | Anandan et al. |
| 2004/0208632 A1 | 10/2004 | Dietz et al. |
| 2004/0220922 A1 | 11/2004 | Lovison et al. |
| 2004/0257311 A1 | 12/2004 | Kanai et al. |
| 2004/0263802 A1 | 12/2004 | Seki et al. |
| 2005/0004727 A1 | 1/2005 | Remboski et al. |
| 2005/0030203 A1 | 2/2005 | Sharp et al. |
| 2005/0030267 A1 | 2/2005 | Tanghe et al. |
| 2005/0053378 A1 | 3/2005 | Stanchfield et al. |
| 2005/0077838 A1 | 4/2005 | Blümel |
| 2005/0110777 A1 | 5/2005 | Geaghan et al. |
| 2005/0117190 A1 | 6/2005 | Iwauchi et al. |
| 2005/0169643 A1 | 8/2005 | Franklin |
| 2005/0200292 A1 | 9/2005 | Naugler et al. |
| 2005/0207157 A1 | 9/2005 | Tani |
| 2005/0242742 A1 | 11/2005 | Cheang et al. |
| 2005/0259439 A1 | 11/2005 | Cull et al. |
| 2005/0265731 A1 | 12/2005 | Keum et al. |
| 2006/0012986 A1 | 1/2006 | Mazzochette et al. |
| 2006/0056855 A1* | 3/2006 | Nakagawa ......... H04B 10/1141 398/183 |
| 2006/0115386 A1 | 6/2006 | Michaels et al. |
| 2006/0145887 A1 | 7/2006 | Mcmahon |
| 2006/0164291 A1 | 7/2006 | Gunnarsson |
| 2006/0198463 A1 | 9/2006 | Godin |
| 2006/0220990 A1 | 10/2006 | Coushaine et al. |
| 2006/0227085 A1 | 10/2006 | Boldt et al. |
| 2007/0007898 A1 | 1/2007 | Bruning |
| 2007/0040512 A1 | 2/2007 | Jungwirth et al. |
| 2007/0109239 A1 | 5/2007 | den Boer et al. |
| 2007/0132592 A1 | 6/2007 | Stewart et al. |
| 2007/0139957 A1 | 6/2007 | Haim et al. |
| 2007/0147843 A1 | 6/2007 | Fujiwara |
| 2007/0230322 A1 | 10/2007 | Morita |
| 2007/0248180 A1 | 10/2007 | Bowman et al. |
| 2007/0254694 A1 | 11/2007 | Nakagwa et al. |
| 2007/0279346 A1 | 12/2007 | den Boer et al. |
| 2007/0291197 A1 | 12/2007 | Furukawa et al. |
| 2008/0061717 A1 | 3/2008 | Bogner et al. |
| 2008/0067942 A1 | 3/2008 | Watanabe et al. |
| 2008/0107029 A1 | 5/2008 | Hall et al. |
| 2008/0120559 A1 | 5/2008 | Yee |
| 2008/0136334 A1 | 6/2008 | Robinson et al. |
| 2008/0136770 A1 | 6/2008 | Ferentz et al. |
| 2008/0136771 A1 | 6/2008 | Chen et al. |
| 2008/0150864 A1 | 6/2008 | Bergquist |
| 2008/0174530 A1 | 7/2008 | Booth et al. |
| 2008/0186898 A1 | 8/2008 | Petite |
| 2008/0222367 A1 | 9/2008 | Co |
| 2008/0235418 A1 | 9/2008 | Werthen et al. |
| 2008/0253766 A1 | 10/2008 | Yu et al. |
| 2008/0265799 A1 | 10/2008 | Sibert |
| 2008/0297066 A1 | 12/2008 | Meijer et al. |
| 2008/0297070 A1 | 12/2008 | Kuenzler et al. |
| 2008/0304833 A1 | 12/2008 | Zheng |
| 2008/0309255 A1 | 12/2008 | Myers et al. |
| 2008/0317475 A1 | 12/2008 | Pederson et al. |
| 2009/0026978 A1 | 1/2009 | Robinson |
| 2009/0040154 A1 | 2/2009 | Scheibe |
| 2009/0049295 A1 | 2/2009 | Erickson et al. |
| 2009/0051496 A1 | 2/2009 | Pahlavan et al. |
| 2009/0121238 A1 | 5/2009 | Peck |
| 2009/0171571 A1 | 7/2009 | Son et al. |
| 2009/0189776 A1 | 7/2009 | Cheron et al. |
| 2009/0196282 A1 | 8/2009 | Fellman et al. |
| 2009/0245101 A1 | 10/2009 | Kwon et al. |
| 2009/0278789 A1 | 11/2009 | Declercq et al. |
| 2009/0284511 A1 | 11/2009 | Takasugi et al. |
| 2009/0303972 A1 | 12/2009 | Flammer, III et al. |
| 2010/0005533 A1 | 1/2010 | Shamir |
| 2010/0052542 A1 | 3/2010 | Siemiet et al. |
| 2010/0054748 A1 | 3/2010 | Sato |
| 2010/0061734 A1 | 3/2010 | Knapp |
| 2010/0096447 A1 | 4/2010 | Kwon et al. |
| 2010/0117543 A1 | 5/2010 | Van Der Veen et al. |
| 2010/0134021 A1 | 6/2010 | Ayres |
| 2010/0134024 A1 | 6/2010 | Brandes |
| 2010/0141159 A1 | 6/2010 | Shiu et al. |
| 2010/0182294 A1 | 7/2010 | Roshan et al. |
| 2010/0188443 A1 | 7/2010 | Lewis et al. |
| 2010/0188972 A1 | 7/2010 | Knapp |
| 2010/0194299 A1 | 8/2010 | Ye et al. |
| 2010/0201274 A1 | 8/2010 | Deixler |
| 2010/0213856 A1 | 8/2010 | Mizusako |
| 2010/0272437 A1 | 10/2010 | Yoon et al. |
| 2010/0301777 A1 | 12/2010 | Kraemer |
| 2010/0327764 A1 | 12/2010 | Knapp |
| 2011/0031894 A1 | 2/2011 | Van De Ven |
| 2011/0044343 A1 | 2/2011 | Sethuram et al. |
| 2011/0052214 A1 | 3/2011 | Shimada et al. |
| 2011/0062874 A1 | 3/2011 | Knapp |
| 2011/0063214 A1 | 3/2011 | Knapp |
| 2011/0063268 A1 | 3/2011 | Knapp |
| 2011/0068699 A1 | 3/2011 | Knapp |
| 2011/0069094 A1 | 3/2011 | Knapp |
| 2011/0069960 A1 | 3/2011 | Knapp et al. |
| 2011/0076024 A1 | 3/2011 | Damink |
| 2011/0133654 A1 | 6/2011 | Mckenzie et al. |
| 2011/0148315 A1 | 6/2011 | Van Der Veen et al. |
| 2011/0150028 A1 | 6/2011 | Nguyen et al. |
| 2011/0248640 A1 | 10/2011 | Welten |
| 2011/0253915 A1 | 10/2011 | Knapp |
| 2011/0299854 A1 | 12/2011 | Jonsson et al. |
| 2011/0309754 A1 | 12/2011 | Ashdown et al. |
| 2012/0001567 A1 | 1/2012 | Knapp et al. |
| 2012/0056545 A1 | 3/2012 | Radermacher et al. |
| 2012/0153839 A1 | 6/2012 | Farley et al. |
| 2012/0229032 A1 | 9/2012 | Van De Ven et al. |
| 2012/0299481 A1 | 11/2012 | Stevens |
| 2012/0306370 A1 | 12/2012 | Van De Ven et al. |
| 2013/0016978 A1 | 1/2013 | Son et al. |
| 2013/0088522 A1 | 4/2013 | Gettemy et al. |

(56) References Cited

U.S. PATENT DOCUMENTS

| | | | |
|---|---|---|---|
| 2013/0108275 A1* | 5/2013 | Knutson | H04N 21/4882 398/107 |
| 2013/0183042 A1 | 7/2013 | Knapp et al. | |
| 2013/0201690 A1 | 8/2013 | Vissenberg et al. | |
| 2013/0257314 A1 | 10/2013 | Alvord et al. | |
| 2013/0293147 A1 | 11/2013 | Rogers et al. | |
| 2014/0028377 A1 | 1/2014 | Rosik et al. | |
| 2015/0022110 A1 | 1/2015 | Sisto | |
| 2018/0233030 A1 | 8/2018 | Knapp et al. | |

FOREIGN PATENT DOCUMENTS

| | | |
|---|---|---|
| CN | 1573881 A | 2/2005 |
| CN | 1650673 A | 8/2005 |
| CN | 1849707 A | 10/2006 |
| CN | 101083866 A | 12/2007 |
| CN | 101150904 A | 3/2008 |
| CN | 101322441 A | 12/2008 |
| CN | 101331798 A | 12/2008 |
| CN | 101458067 A | 6/2009 |
| EP | 0196347 A1 | 10/1986 |
| EP | 0456462 A2 | 11/1991 |
| EP | 2273851 A2 | 1/2011 |
| GB | 2307577 A | 5/1997 |
| JP | H06302384 A | 10/1994 |
| JP | H08201472 A | 8/1996 |
| JP | H1125822 A | 1/1999 |
| JP | 2000286067 A | 10/2000 |
| JP | 2001514432 A | 9/2001 |
| JP | 2002353900 A | 12/2002 |
| JP | 2004325643 A | 11/2004 |
| JP | 2005539247 A | 12/2005 |
| JP | 2006093450 A | 4/2006 |
| JP | 2006260927 A | 9/2006 |
| JP | 2007047352 A | 2/2007 |
| JP | 2007266974 A | 10/2007 |
| JP | 2007267037 A | 10/2007 |
| JP | 2008500583 A | 1/2008 |
| JP | 2008507150 A | 3/2008 |
| JP | 2008300152 A | 12/2008 |
| JP | 2009134877 A | 6/2009 |
| JP | 2010525567 A | 7/2010 |
| KR | 20080073172 A | 8/2008 |
| KR | 20080077353 A | 8/2008 |
| WO | 9910867 A1 | 3/1999 |
| WO | 0037904 A1 | 6/2000 |
| WO | 03075617 A1 | 9/2003 |
| WO | 2005024898 A2 | 3/2005 |
| WO | 2007069149 A1 | 6/2007 |
| WO | 2008065607 A2 | 6/2008 |
| WO | 2008129453 A1 | 10/2008 |
| WO | 2008152922 A1 | 12/2008 |
| WO | 2010124315 A1 | 11/2010 |
| WO | 2012005771 A2 | 1/2012 |
| WO | 2012042429 A2 | 4/2012 |
| WO | 2013142437 A1 | 9/2013 |

OTHER PUBLICATIONS

"Decision to Grant a Patent, JP Application 2012-520587, dated Oct. 21, 2015", 2 pages.
"European Search Report and European Search Opinion, EPC Application 10806752.1, dated Jun. 9, 2017", 12 pages.
"European Search Report and Search Opinion, EPC Application 10800143.9, dated Feb. 24, 2017", 10 pages.
"Final Office Action for U.S. Appl. No. 12/803,805 dated Jun. 23, 2015", 75 pages.
"Final Office Action for U.S. Appl. No. 13/773,322, dated Sep. 2, 2015".
"Final Office Action dated Jan. 28, 2015, for U.S. Appl. No. 12/806,117", 23 pages.
"Final Office Action dated Jul. 9, 2013, for U.S. Appl. No. 12/806,118", 30 pages.
"Final Office Action dated Jun. 14, 2013, for U.S. Appl. No. 12/806,117", 23 pages.
"Final Office Action dated Jun. 18, 2014, for U.S. Appl. No. 13/231,077", 47 pages.
"Final Office Action dated Nov. 28, 2011, for U.S. Appl. No. 12/360,467", 17 pages.
"Final Office Action dated Oct. 11, 2012, for U.S. Appl. No. 12/806,121", 24 pages.
"Final Office Action dated Sep. 12, 2012, for U.S. Appl. No. 12/584,143", 16 pages.
"International Preliminary Report on Patentability and Written Opinion for PCT/US2009/004953 dated Mar. 8, 2011".
"International Preliminary Report on Patentability, Int'l Application PCT/US2010/001919, dated Jan. 26, 2012", 7 pages.
"International Preliminary Report on Patentability, Int'l Application PCT/US2010/002171, dated Feb. 16, 2012", 6 pages.
"International Search Report & Written Opinion for PCT/US2010/000219 dated Oct. 12, 2010".
"International Search Report & Written Opinion for PCT/US2012/052774 dated Feb. 4, 2013".
"International Search Report & Written Opinion dated Sep. 19, 2012, for PCT/US2012/045392".
"International Search Report & Written Opinion, PCT/US2010/001919, dated Feb. 24, 2011".
"International Search Report & Written Opinion, PCT/US2010/002171, dated Nov. 24, 2010".
"International Search Report & Written Opinion, PCT/US2010/004953, dated Mar. 22, 2010".
"International Search Report & Written Opinion, PCT/US2013/027157, dated May 16, 2013".
"International Search Report and Written Opinion for PCT/US2014/068556 dated Jun. 22, 2015".
"International Search Report and Written Opinion for PCT/US2015/037660 dated Oct. 28, 2015".
"LED Fundamentals, How to Read a Datasheet (Part 2 of 2) Characteristic Curves, Dimensions and Packaging", OSRAM Opto Semiconductors, Aug. 19, 2011, 17 pages.
"Notice of Allowance for U.S. Appl. No. 12/806,117 dated Nov. 18, 2015", 18 pages.
"Notice of Allowance for U.S. Appl. No. 13/970,944 dated Sep. 11, 2015", 10 pages.
"Notice of Allowance for U.S. Appl. No. 14/097,355 dated Mar. 30, 2015", 9 pages.
"Notice of Allowance for U.S. Appl. No. 14/510,212 dated May 22, 2015", 12 pages.
"Notice of Allowance for U.S. Appl. No. 14/510,243 dated Nov. 6, 2015", 9 pages.
"Notice of Allowance for U.S. Appl. No. 14/604,881 dated Oct. 9, 2015", 8 pages.
"Notice of Allowance for U.S. Appl. No. 14/604,886 dated Sep. 25, 2015", 8 pages.
"Notice of Allowance dated Aug. 21, 2014, for U.S. Appl. No. 12/584,143", 5 pages.
"Notice of Allowance dated Feb. 21, 2014, for U.S. Appl. No. 12/806,118", 9 pages.
"Notice of Allowance dated Feb. 25, 2013, for U.S. Appl. No. 12/806,121", 11 pages.
"Notice of Allowance dated Feb. 4, 2013, for U.S. Appl. No. 12/806,113", 9 pages.
"Notice of Allowance dated Jan. 20, 2012, for U.S. Appl. No. 12/360,467", 5 pages.
"Notice of Allowance dated Jan. 28, 2014, for U.S. Appl. No. 13/178,686", 10 pages.
"Notice of Allowance dated May 3, 2013, for U.S. Appl. No. 12/806,126", 6 pages.
"Notice of Allowance dated Oct. 15, 2012, for U.S. Appl. No. 12/806,113", 8 pages.
"Notice of Allowance dated Oct. 31, 2013, for U.S. Appl. No. 12/924,628", 10 pages.
"Notice of Final Rejection, KR Application 10-2012-7003792, dated Jun. 22, 2016", 1 page.
"Notice of Final Rejection, KR Application 10-2012-7005884, dated Jul. 20, 2016", 1 page.

(56) References Cited

OTHER PUBLICATIONS

"Notification of Reason for Refusal, KR Application 10-2012-7003792, dated Mar. 7, 2016", 7 pages.
"Notification of Reason for Refusal, KR Application 10-2012-7005884, dated Apr. 28, 2016", 3 pages.
"Notification to Grant Patent Right for Invention, CN Application 2010-80032373.7, dated Aug. 6, 2014", 2 pages.
"Notification to Grant Patent Right for Invention, CN Application 2010-80035731.X, dated Aug. 6, 2015", 2 pages.
"Office Action for JP Application 2012-523605, dated Mar. 11, 2014".
"Office Action for JP Application 2012-523605, dated Sep. 24, 2014".
"Office Action for U.S. Appl. No. 12/806,117 dated May 27, 2015", 20 pages.
"Office Action for U.S. Appl. No. 13/970,964 dated Jun. 29, 2015", 17 pages.
"Office Action for U.S. Appl. No. 13/970,990 dated Aug. 20, 2015", 8 pages.
"Office Action for U.S. Appl. No. 14/305,456 dated Apr. 8, 2015", 9 pages.
"Office Action for U.S. Appl. No. 14/305,472 dated Mar. 25, 2015", 12 pages.
"Office Action for U.S. Appl. No. 14/510,243 dated Jul. 28, 2015", 8 pages.
"Office Action for U.S. Appl. No. 14/510,266 dated Jul. 31, 2015", 10 pages.
"Office Action for U.S. Appl. No. 14/510,283 dated Jul. 29, 2015", 9 pages.
"Office Action for U.S. Appl. No. 14/573,207 dated Nov. 4, 2015", 23 pages.
"Office Action dated Apr. 22, 2014, for U.S. Appl. No. 12/806,114", 16 pages.
"Office Action dated Aug. 2, 2012, for U.S. Appl. No. 12/806,114", 14 pages.
"Office Action dated Dec. 17, 2012, for U.S. Appl. No. 12/806,118", 29 pages.
"Office Action dated Dec. 4, 2013, for U.S. Appl. No. 12/803,805", 19 pages.
"Office Action dated Feb. 1, 2012, for U.S. Appl. No. 12/584,143", 12 pages.
"Office Action dated Feb. 17, 2015, for JP Application 2012-520587".
"Office Action dated Feb. 2, 2015, for CN Application 201080035731.X".
"Office Action dated Jul. 1, 2014, for JP Application 2012-520587".
"Office Action dated Jul. 10, 2012, for U.S. Appl. No. 12/806,113", 11 pages.
"Office Action dated Jul. 11, 2012, for U.S. Appl. No. 12/806,121", 23 pages.
"Office Action dated Jun. 10, 2013, for U.S. Appl. No. 12/924,628", 9 pages.
"Office Action dated Jun. 23, 2014, for U.S. Appl. No. 12/806,117".
"Office Action dated Jun. 27, 2013, for U.S. Appl. No. 13/178,686".
"Office Action dated Mar. 6, 2015, for U.S. Appl. No. 13/773,322", 30 pages.
"Office Action dated May 12, 2011, for U.S. Appl. No. 12/360,467", 19 pages.
"Office Action dated Nov. 4, 2013, for CN Application No. 201080032373.7".
"Office Action dated Nov. 12, 2013, for U.S. Appl. No. 13/231,077", 31 pages.
"Office Action dated Oct. 2, 2012 for U.S. Appl. No. 12/806,117", 22 pages.
"Office Action dated Oct. 24, 2013, for U.S. Appl. No. 12/806,117", 19 pages.
"Office Action dated Oct. 9, 2012, for U.S. Appl. No. 12/806,126", 6 pages.
"Office Action dated Sep. 10, 2014, for U.S. Appl. No. 12/803,805", 28 pages.
"Partial International Search Report for PCT/US2014/068556 dated Mar. 27, 2015".
"Partial International Search Report for PCT/US2015/037660 dated Aug. 21, 2015".
"Partial International Search Report for PCT/US2015/045252 dated Nov. 18, 2015".
"Partial International Search Report dated Nov. 16, 2012, for PCT/US2012/052774".
"Search Report by Registered Search Organization, JP Application 2012-520587, dated May 30, 2014", 10 pages.
"Search Report by Registered Search Organization, JP Application 2012-523605, dated Feb. 25, 2014", 15 pages.
"Supplementary Partial European Search Report, EPC Application 10806752.1, dated Mar. 8, 2017", 6 pages.
"The First Office Action, CN Application 2010-80035731.X, dated Jun. 5, 2014", 5 pages.
"The Second Office Action, CN Application 2010-80032373.7, dated Apr. 15, 2014", 5 pages.
"U.S. Appl. No. 12/924,628, filed Sep. 30, 2010", 34 pages.
Bouchet, et al., "Visible-Light Communication System Enabling 73 Mb/s Data Streaming", IEEE Globecom Workshop on Optical Wireless Communications, 2010, pp. 1042-1046.
Chonko, "Use Forward Voltage Drop to Measure Junction Temperature", 2013 Penton Media, Inc., 24 pages.
Hall, et al., "Jet Engine Control using Ethernet with a BRAIN (Postprint)", AIAA/ASME/SAE/ASEE, Joint Propulsion Conference and Exhibition, Jul. 2008, pp. 1-18.
Johnson, "Visible Light Communication: Tutorial", Project IEEE P802.15 Working Group for Wireless Personal Area Networks (WPANs), Mar. 2008, 78 pages.
Johnson, "Visible Light Communications", CTC Tech Brief, Nov. 2009, 2 pages.
Kebemou, "A Partitioning-Centric Approach for the Modeling and the Methodical Design of Automotive Embedded System Architectures", Dissertation of Technical University of Berlin, 2008, 180 pages.
O'Brien, et al., "Visible Light Communications and Other Developments in Optical Wireless", Wireless World Research Forum, 2006, 26 pages.
Zalewski, et al., "Safety Issues in Avionics and Automotive Databuses", IFAC World Congress, Jul. 2005, 6 pages.

* cited by examiner

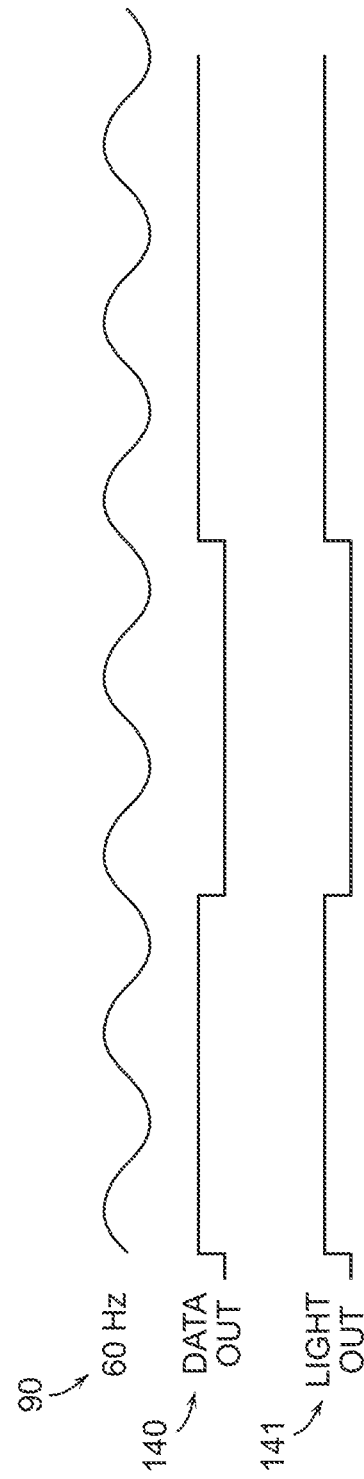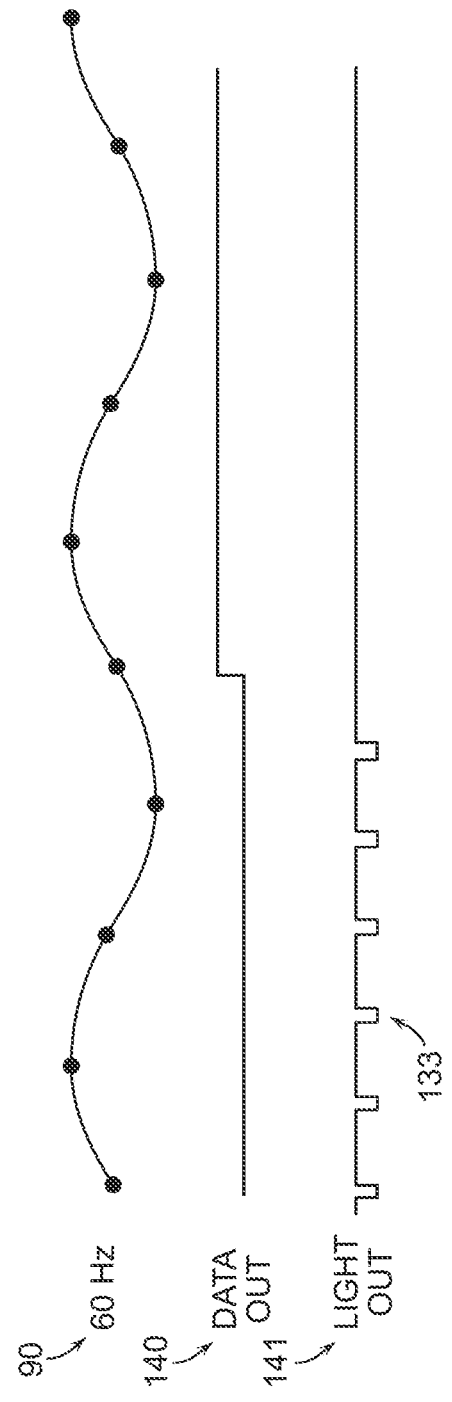

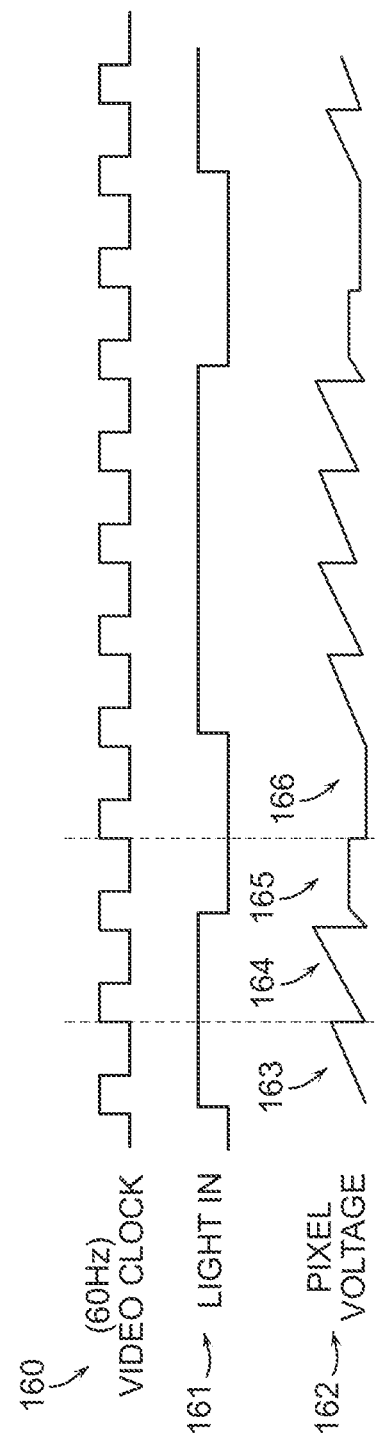

VISIBLE LIGHT COMMUNICATION SYSTEM AND METHOD

CROSS-REFERENCE TO RELATED APPLICATIONS

This application is a continuation of application Ser. No. 17/102,369, filed Nov. 23, 2020; which is a continuation of application Ser. No. 15/953,202, filed Apr. 13, 2018, now U.S. Pat. No. 10,847,026, issued Nov. 24, 2020; which is a continuation of application Ser. No. 13/773,322, filed Feb. 21, 2013, now U.S. Pat. No. 10,210,750, issued Feb. 19, 2019; which claims priority to Provisional Application No. 61/601,153, filed Feb. 21, 2012. Application Ser. No. 13/773,322 is further a continuation-in-part of application Ser. No. 13/231,077, filed Sep. 13, 2011, now abandoned. All these applications are hereby incorporated by reference in their entireties.

BACKGROUND

Field of the Invention

This invention relates to visible light communication systems and, more particularly, to using remote control devices with cameras to communicate with controlled devices using visible light.

Description of Related Art

Remote controllers have become ubiquitous for controlling all sorts of electronic components, including TVs, sound systems, ceiling fans, projectors, computers, thermostats, lighting systems, etc. However, each remote controller is typically unique for the particular associated electronic device. Universal remote controllers have had some success combining functions in one handheld device; however, they are expensive, cumbersome, and subject to being lost.

Remote control can be useful for a number of different reasons. The most common advantage is being able to change channels on a TV set without having to move from the comfort of a chair or couch. Another advantage is being able to control a device, such as a light or ceiling fan that may be attached to a high ceiling and out of reach. Another advantage is that having a remote controller can reduce the size and complexity of the device being controlled. For instance, the remote controller can have multiple buttons and indicators or even a touch screen and computer for controlling the device. This can enable the controlled device to simply be configured to send and receive wireless data.

Remote controllers can communicate using a variety of wireless communication protocols, but typically use infrared light or radio frequency (RF) electromagnetic radiation based physical layers. For example, many commercial and residential lighting systems have remote controllers that enable lights to be controlled locally. However, these remote controllers typically use infrared physical layers, which require the light fixtures to have infrared transceivers. This inevitably increases the cost of the lighting control system.

Some lighting control systems have been introduced that use visible light communication (VLC) to communicate optical data to light fixtures or other devices. Lighting control systems that use VLC have many advantages over conventional lighting control systems that use infrared remote controllers and transceivers or employ other types of wired and wireless communication protocols. One big advantage is that the visible light spectrum is currently globally unregulated and does not suffer from the congestion and interference common in RF-based communication systems. Another advantage is cost savings.

For example, light fixtures controlled by visible light do not use infrared transceivers for communicating with infrared remote controllers, and thus, do not incur the costs associated with conventional lighting control systems. In addition, a lighting control system employing visible light communication may transmit optical data using the same light fixture used to provide illumination, e.g., in a room of a building. In the case that the light fixture comprises one or more LEDs, the LEDs can also be used as light detectors for receiving optically transmitted data. Finally, no dedicated wires are needed in a system that transmits optical data using visible light traveling through free space. This is especially important for installation of lighting control systems in existing buildings. These advantages, and possibly others, enable the visible light communication protocol to be implemented within a lighting control system for very little cost.

A limitation of the visible light communication protocol, and specifically, a protocol that transmits optical data using visible light traveling through free space, is that it is typically limited in communication range and generally restricted to line of sight. In other words, optical data transmitted through free space typically cannot be communicated around corners or through walls between various rooms in a building, or between light fixtures and other devices that are too far away and outside of the optical communication range of the remote control device. Therefore, a need exists for a system and method that can extend the communication range in a visible light communication system.

SUMMARY

A system, remote control device, and method are provided herein for communicating with and controlling various devices using visible light communication (VLC). According to one embodiment, the system and method described herein may use a smart phone, or other device, as a remote control device to communicate with and control various other devices using optically-modulated data transmitted through free space using visible light.

As used herein, the term "visible light" refers to a portion of the electromagnetic spectrum that is visible to (can be detected by) the human eye, and typically includes wavelengths from about 390 nm to about 700 nm. Electromagnetic radiation in this range of wavelengths is called visible light or simply light. In the system described herein, only visible light sources are used to transmit optical data.

As used herein, the term "free space" refers to communication within space, but not confined to, for example, an optical fiber. Thus, transfer of data occurs optically, but not constrained within an optical fiber or any other type of waveguide device yet is free and able to travel optically in any non-obstructed direction.

As used herein, the term "smart phone" refers to any mobile phone that uses RF transceivers to communicate bi-directionally according to well-known cellular protocols. In addition to RF transceivers, a "smart phone" as used herein may generally include a memory for storing one or more software applications (typically referred to as smart phone applications or "apps"), a processor for executing the one or more software applications, and a display screen for displaying a graphical user interface associated with the software applications. The display screen may be a touch screen display comprising a backlight for illuminating the touch screen display and a touch sensitive surface for receiving user input. In some cases, the smart phone may also include a camera and a camera flash.

In some embodiments, a smart phone configured for visible light communication may use the camera flash as a light source and optical transmitter, and the camera image sensor as an optical receiver. However, the remote control device described herein is not limited to a smart phone, and the light source does not have to be a flash. In alternative embodiments, a laptop computer, a desktop computer, a hand-held device, or a wall-mounted unit could operate as a VLC remote control device, for example, by modulating the backlight of a display screen (or other light source) for the purpose of transmitting optical data to one or more controlled devices.

In some embodiments, the remote control device and the controlled devices may each include one or more light-emitting diodes (LEDs). LEDs are desirable as they can be alternately configured to receive light and to emit light. In addition, LEDs may be configured for transmitting optical data by modulating the drive current supplied to an LED to produce light modulated with data.

In one exemplary application, the remote control device described herein may be used to communicate with light fixtures and lighting systems for controlling such lights, and to enable the lighting system to provide a communication channel between the remote control device and various remotely controlled devices. Although described here in the context of a lighting control system, the system, remote control device, and method provided herein are not limited to such and may be configured for controlling a wide variety of controlled devices. For example, the devices being controlled may be a light fixture, a thermostat, a security system component, a TV, a ceiling fan, a home appliance, or other type of remotely controlled electronic device.

According to one embodiment, a remote control device (e.g., a smart phone) may transmit data to a controlled device by modulating the light produced by the LED flash of a camera included within the remote control device. The device being controlled (e.g., a light fixture, a thermostat, or other type of remotely controlled device) may configure its LED as a photo-detector to receive the data sent optically through free space by the LED flash on the remote control device. Depending on the message, the controlled device can respond by driving its LED with high current modulated with data to produce light modulated with data. The remote control device may then detect this light and the data being modulated using an image sensor in the camera, for example.

In order to receive optically-transmitted data from the remote control device, the LED(s) of the controlled device (s) may be periodically and momentarily turned off to measure incoming light from the remote control device. This may be done at a relatively high rate (e.g., 360 Hz) that can't be seen by the human eye and is preferably higher than the modulation rate of the light produced by the camera flash when transmitting data. In some embodiments, the LED lights of the controlled devices may be synchronized to a common source (e.g., an AC mains), and thus to each other, so that they all turn off at the same time, and consequently do not interfere with data communication between each other, the remote control device, or any other remotely controlled devices. The times when the LEDs are not producing light are referred to herein as communication gaps.

According to one embodiment, a controlled device can measure the incoming light level during each communication gap, preferably using the same LEDs used for emission, and produce a stream of data proportional to the incoming light level. From such data streams, the controlled device may identify light level changes, which correspond to modulated data transitions. Circuitry in the controlled device may decode the data to determine the message being sent by the remote control device. Depending on the message, each controlled device can respond to the remote control device by modulating the brightness and/or color of the light being produced by its LED. Image processing software stored within and executed by the remote control device may then be used to determine the location of each controlled device and the data being communicated.

After transmitting a message using the LED camera flash, the remote control device may turn on the camera's image sensor and record a video for an amount of time anticipated for a response from the device or devices being controlled. Software within the remote control device may then analyze the video to determine the location of the device or devices responding with light and the data being communicated. For example, the software may detect optically-transmitted data by scanning one or more frames of video data for the brightness and potentially color of the light emitted from the LED of a controlled device. By analyzing successive video frames, the software can determine when the brightness and/or color of the light produced by a particular controlled device change, which indicates transitions in the modulated data being communicated from the controlled device to the remote control device. To ensure accurate detection, the transitions in the modulated data should occur at a rate slower than the frame rate of the camera.

Although an LED or photodiode could be used for such purpose, the remote control device described herein preferably uses a camera to receive light emitted from the controlled devices. This is because cameras have two-dimensional image sensors, which typically have millions of pixels that can be used to detect light of different wavelengths that fall within the camera's field of view. By utilizing an image sensor, instead of a discrete LED or photodiode, the image processing software within the remote control device can identify the location of many light sources within the camera's field of view, and track the changes in brightness and/or color over time. This enables the remote control device to receive data or messages from many controlled devices simultaneously.

The method described so far enables a remote control device to broadcast messages to all controlled devices located within a given communication range, and for all such devices within the field of view of the camera to communicate back to the remote control device. As set forth in more detail below, the system and method described herein also enables a remote control device to communicate bi-directionally with an individually addressed device.

According to one embodiment, a system and method are provided herein for establishing a bi-directional communication link between a remote control device and a selected one of the controlled devices. In some cases, the remote control device may initiate communication by broadcasting a message to all controlled devices located within a communication range of the remote control device, wherein such broadcast message includes a request to respond with a random number or unique pre-programmed ID. The application software on the remote control device can then produce an image on the display screen showing all the devices detected within the camera's field of view, and identify each device that responded to the broadcast message. The user of the remote control device can then touch one of the devices displayed in the image to select that device for subsequent communication. A bi-directional communication link between the remote control device and the selected device is thereafter established by using the random number or unique ID of the selected device as an address in subsequent communication messages.

As an example, suppose there are 100 lights (controlled devices) in the high ceiling of an auditorium. A user may position the camera of the remote control device to take a picture of the 100 lights, or some portion thereof, and push a button provided by the graphical user interface (GUI) on the touch screen of the remote control device. The remote control device may then modulate light from the camera flash, for example, to send a broadcast message to all lights that can receive the message requesting those lights to respond with a random number or unique ID. The remote control device may then start recording a video. All lights that received the broadcast message may respond with the random number or unique ID by modulating each light's output brightness (or color) with data. The application software within the remote control device may then analyze the video, identify the location (set of pixels) of each light within each video frame, determine the brightness (and/or color) of each light as a function of time, and determine the data being sent from each light from changes in the brightness (and/or color) of each light over time.

From the data that the remote control device decodes from each light, the application software can make sure that all random numbers or IDs received are unique, and can display one frame of the video on the touch screen display designating each light with a unique number and a circle, for instance. In some cases, the graphical user interface may allow the user to zoom in on a region of the light to be adjusted, and select that light with a double touch, for instance. A menu could then pop up that provides buttons, sliders, etc., that enable the user to configure or monitor various parameters, functions, etc., of the selected light. Such parameters could be color, brightness, etc., or things like diagnostics, power consumption, or status could be read. For example, the camera on the remote control device could be used to measure the color point of the light, and to provide feedback to the light to adjust the output color to a particular color point or correlated color temperature (CCT).

Once the user selects something from the graphical user interface by selecting a touch screen button, for instance, a message may be sent to the selected light using the random number or unique ID in the address field of the message transmitted by the camera flash. All lights within range will receive the message, however, only the selected light with that random number or ID will respond. As such, bi-directional communication with individual devices can be achieved.

According to another embodiment, a system and method are provided herein for increasing the optical power and extending the communication range of optical data transmitted in a visible light communication system. This embodiment uses the controlled devices themselves (e.g., the multitude of lights in an auditorium) to amplify the optical power of the messages transmitted by the remote control device, or messages transmitted between controlled devices, to extend the communication range of the visible light communication system.

As used herein, a "communication range" refers to an optical communication range, and specifically, a range of distances within which a receiving device can receive optical data transmitted from a sending device through free space using visible light. The communication range extends from the sending device up to a maximum distance at which a receiving device can receive optical data from the sending device. A receiving device located beyond the maximum distance is said to be located outside of the communication range of the sending device.

In a visible light communication system, the maximum distance may be generally determined by the brightness and directionality of the visible light emitted by the sending device, as well as the light detection sensitivity of the receiving device. In some cases, however, the maximum distance may be affected by obstacles in the communication path (such as walls or other optically-dense structures in a room), or deviations from a straight-line communication path (such as when light is to be transmitted around corners). The embodiment described herein increases the communication range of a visible light communication system by using one or more of the controlled devices to retransmit the communication messages received by the controlled devices. Controlled devices may receive communication messages from the remote control device, and/or retransmitted communication messages from other controlled devices. In addition to amplifying the optical power of the communication messages transmitted by the remote control device, the retransmission of communication messages may enable controlled devices outside of the communication range of the remote control device to receive retransmitted messages from controlled devices located within range of the remote control device.

In some cases, the communication range of the visible light communication system may be extended by using one or more controlled devices to amplify a sequence of communication messages transmitted by a remote control device. In general, the remote control device may be configured to send two (or more) communication messages sequentially with a fixed timing between each message. In one example, a first communication message and a second communication may be sent by the remote control device, wherein the second communication message is substantially identical to the first communication message.

The first message could be broadcast to all controlled devices within range of the remote control device, groupcast to a set of controlled devices, or unicast to an individual controlled device. The first message may include a plurality of data fields, one of which contains information that the first message should be amplified or repeated by the controlled devices that receive the first message. The controlled devices that properly receive the first message may adjust their bit timing to that of the received first message and retransmit the first message in synchronization with a second message being sent from the remote control device. Since the second message is substantially identical to the first message, retransmitting the first message in synchronization with the second message effectively increases the optical power of the second message sent by the remote control device. By utilizing the optical power of the controlled devices to amplify the second message sent by the remote control device, the optical power and communication range of the second message can be orders of magnitude larger than simply relying on the optical power of the remote control device alone.

In other cases, the communication range may be extended by using one or more controlled devices to retransmit a communication message sent from the remote control device, wherein the communication message is retransmitted by the controlled devices a specified number (N) of times. As in the previous case, the communication message may include a plurality of data fields, one of which contains information that the communication message should be retransmitted by the controlled devices that receive the communication message. In this example, the communication message may contain a repeat field that specifies a number (N) of times the communication message should be retransmitted by the controlled devices. In general, the number "N" may be substantially any number greater than or equal to one. Controlled devices that receive the communication message from the remote control device decrement the number (e.g., N−1) in the repeat field of the received message, and retransmit the communication message with the decremented number in the repeat field of the retransmitted message.

In this case, the remote control device may be configured for sending only one communication message (i.e., a first communication message) to nearby controlled devices within range of the remote control device. After decrementing the number (N) in the repeat field of the received message, the nearby controlled devices may retransmit the communication message to controlled devices outside of the communication range of the remote control device. In this manner, the communication range may be extended by using the controlled devices to relay messages to other devices.

Unlike the previous case, the controlled devices do not synchronize retransmissions to the bit timing of the received first message. Instead, the controlled devices may be synchronized to a common timing reference, and thus, may communicate in synchronization with each other. By synchronizing the timing of the controlled devices to a common timing reference, the controlled devices can receive and retransmit communication messages to other controlled devices in synchronization with each other.

In one embodiment, the controlled devices may be coupled to a common power source, such as the AC mains of a building, and may be synchronized to a common timing reference generated from the AC power source. For example, the controlled devices may each comprise a phase-locked loop (PLL) configured to generate the common timing reference by locking onto an AC signal provided by the AC power source.

Regardless of how the retransmitted messages are synchronized, the retransmit command may be used to communicate with a device to be controlled when that device is very far away, but within line of sight of the remote control device. In this case, the light source (e.g., the camera flash) on the remote control device may not have sufficient optical power to send messages to a distant controlled device. In order to reach the distant controlled device, the remote control device may send one or more communication messages comprising retransmit commands to nearby controlled devices, possibly at the user's discretion. The nearby controlled devices receive the first communication message and retransmit the first communication message to other controlled devices. In some cases, the first communication message may be retransmitted in synchronization with a second message transmitted from the remote control device to amplify the total transmitted optical power of the second message. In other cases, the first communication message may be retransmitted in synchronization with a common timing reference generated within the controlled devices. By retransmitting or relaying communication messages in such a manner, the distant controlled device may be able to receive the communication message and respond accordingly.

In some cases, a retransmit command may only be necessary when transmitting messages from the remote control device to a controlled device, which is far away but located within the field of view of the camera. This is because a camera is much more sensitive to incoming light than a simple LED connected to an amplifier. For example, a camera has a lens that focuses light onto an image sensor having millions of detectors, while a simple LED measures the total light power coming in from all directions. Therefore, if the LED of the controlled device falls within the field of view of the camera, communication from the controlled device to the camera can occur over relatively long distances.

The retransmit commands described herein are not limited to messages sent from the remote control device to the controlled devices and can also be sent bi-directionally and between controlled devices, themselves. This further extends the control and communication range of the system by enabling the remote control device to communicate with controlled devices that are not within the field of view or line of sight of the remote control device. For instance, a remote control device (or even a device with just an LED for transmitting and receiving light instead of a camera) could send a communication message containing a retransmit command to nearby devices, which would receive and retransmit the communication message in different directions. Not only would this increase the transmit optical power of the message, but a controlled device could receive a message from a controlling device located around a corner, for instance.

A controlled device that is not in the line of sight of a remote control device, or any controlling device with or without a camera, can also communicate back to the controlling device using the retransmit commands described herein. Thus, bi-directional communication is made possible between the controlling and the controlled devices by using the retransmit commands to relay communication messages around corners.

In some cases, the retransmit commands can be used to retransmit messages many times. For instance, a sending device (e.g., either a remote control device, a controlled device, or any device that can communicate using visible light) could specify that a communication message be retransmitted any number of times by including the number in a repeat field of the communication message. Upon receiving the communication message, a controlled device may decrement the number specified in the repeat field of the received message and retransmit the communication message with the decremented number in the repeat field of the retransmitted message. Controlled devices that receive the retransmitted message will retransmit the received message in accordance with the decremented number in the repeat field.

As an example, a sending device could specify that the communication message be retransmitted twice by storing a corresponding bit value in the repeat field of a communication message. Nearby controlled devices within range of the sending device will receive the communication message and retransmit the communication message twice, each time with the bit value in the repeat field decremented accordingly. Controlled devices that are outside the range of the sending device, but within range of the nearby controlled devices, will receive the first retransmitted communication message and transmit the final communication message in synchronization with the controlled devices within range of the sending device. Any number of retransmissions is possible, which can provide virtually unlimited communication range.

According to another embodiment, a system and method is provided herein for using a preamble and a Cyclic Redundancy Check (CRC) checksum in messages sent by a remote control device or other device using light to minimize the probability of such devices responding to incorrect data. For example, the preamble may include a unique sequence that does not exist within the rest of the message. Only after the unique pattern is detected does a receiver begin decoding a message. A CRC checksum calculated at the receiving device is compared to the CRC checksum generated at the transmitting device and sent with the message. Only if both checksums match does a receiving device accept a message.

In addition to providing error protection, the CRC checksum enables a device manufacturer to provide remote control device applications that can communicate only with that manufacturer's devices. By programming a unique manufacturer ID into each controlled device and using such ID as a seed for the CRC checksum, only messages sent by applications that use the same ID as the CRC checksum seed will be accepted.

Of course, the remote control device described herein is not necessarily limited to communicating with devices provided by only one manufacturer. In some embodiments, the controlled devices can perform two CRC checks on all received messages using two different seed values. One seed value can be manufacturer specific, while the second seed can be common to all manufacturers. In this way, applications can be written to control only a specific manufacturer's devices, or all devices from all manufacturers.

According to one embodiment, a memory medium is provided herein containing program instructions, which are executable on a processor of a remote control device for communicating with and controlling one or more controlled devices. In some cases, the program instructions may comprise first program instructions, second program instructions, and third program instructions. The first program instructions may be executable for providing a user interface on a display screen of the remote control device. In general, the user interface may be configured to receive user input for controlling the one or more controlled devices, and in some cases, may be a graphical user interface (GUI). The second program instructions may be executable for generating a communication message based on the user input received by the user interface. As described herein, the generated communication message may include a plurality of data fields. In some cases, the plurality of data fields includes a repeat field that specifies the number of times the communication message should be retransmitted by controlled devices that receive the optically-modulated data. The third program instructions may be executable for modulating a visible light source of the remote control device with data contained within the plurality of data fields to produce optically-modulated data, which is transmitted from the remote control device through free space to the one or more controlled devices.

In some cases, the program instructions may further comprise fourth program instructions, which are executable for configuring a light detector of the remote control device to receive optically-modulated data transmitted from the one or more controlled devices. Like the optically-modulated data transmitted from the remote control device, the optically-modulated data transmitted from the one or more controlled devices may be transmitted through free space using visible light.

In some cases, the fourth program instructions may configure an image sensor of the remote control device to capture a sequence of images of the controlled devices, and the program instructions may further comprise fifth, sixth, seventh, and eighth program instructions. The fifth program instructions may be executable for analyzing the sequence of images to determine a location of the controlled devices, and to determine the optically-modulated data sent from the one or more controlled devices by detecting a change in light output from the controlled devices over time. The sixth program instructions may be executable for displaying one of the images of the controlled devices on the display screen of the remote control device. The seventh program instructions may be executable for enabling a user to select a particular controlled device by touching a portion of the display screen corresponding to the location of the particular controlled device in the displayed image. The eighth program instructions may be executable for generating and directing subsequent communication messages to only the particular controlled device. Additional and/or alternative program instructions may also be included.

The visible light communication systems, methods, and memory mediums described herein provide fundamental advantages that are practically impossible with RF wireless communication protocols. Since the wavelength of RF electromagnetic radiation is orders of magnitude longer than visible light, discrimination between multiple light sources transmitting simultaneously is not possible. With visible light communication, the remote control device, or any device with a camera, can receive light from thousands of sources simultaneously. Further, since RF communication (e.g., Bluetooth) involves frequency and phase modulation of transmitter carrier frequencies, which are generated locally and out of synchronization with other devices, the concept of message amplification is not possible since multiple devices transmitting simultaneously will interfere with each other, instead of amplifying each other. As such, the visible light communication systems and methods described herein have significant practical advantages over today's state-of-the-art communication and control systems.

BRIEF DESCRIPTION OF THE DRAWINGS

The present invention may be better understood, and its numerous objects, features, and advantages made apparent to those skilled in the art by referencing the accompanying drawings.

FIG. 14 is an exemplary timing diagram for a controlled device transmitting data.

FIG. 15 is an alternative exemplary timing diagram for a controlled device transmitting data.

FIG. 16 is an exemplary timing diagram for a remote control device (e.g., a smart phone) receiving data using the camera.

Figure 1:
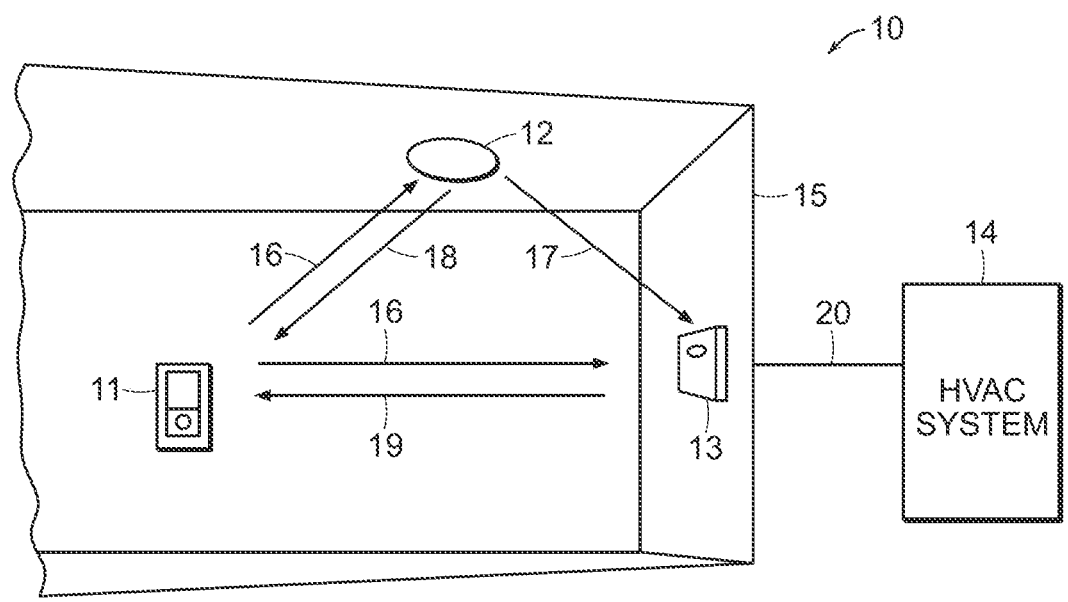
FIG. 1 is an exemplary illustration of a remote control system in which a remote control device communicates with a plurality of controlled devices using visible light, according to one embodiment.

The use of the same reference symbols in different drawings indicates similar or identical items. While the invention is susceptible to various modifications and alternative forms, specific embodiments thereof are shown by way of example in the drawings and will herein be described in detail. It should be understood, however, that the drawings and detailed description thereto are not intended to limit the invention to the forms disclosed, but on the contrary, the intention is to cover all modifications, equivalents, and alternatives falling within the spirit and scope of the present invention as defined by the appended claims.

DETAILED DESCRIPTION OF PREFERRED EMBODIMENTS

Smart phones with touch screen displays and cameras with LED flash are becoming commonplace, and typically include radio frequency (RF) transceivers for communicating bi-directionally, using the RF spectrum, according to cellular phone protocols for long-range communication and Bluetooth protocols for short-range communication. Smart phones are not used to control lighting fixtures in conventional infrared-based lighting control systems, because they do not contain the infrared transceivers necessary for interfacing with these systems.

Recently, smart phones have been used in lighting control systems to communicate with lighting fixtures, or with specialized appliances attached to the fixtures, using radio frequency signals transmitted, e.g., from a Bluetooth radio. However, these lighting control systems require the controlled devices (i.e., the lighting fixtures or the specialized appliances) to also include relatively expensive and limited-range Bluetooth radios. A need remains for a smart phone, or other similar device, that can be used as a remote control device for communicating with and controlling devices that do not include Bluetooth radios (or other RF receivers). In addition to lighting control systems, it is contemplated that such a remote control device may be used for controlling a wide variety of controlled devices using visible light.

Smart phone devices typically have substantial processing power and run software applications that can be downloaded off the Internet and executed on the smart phone for many different purposes. Some of these applications are used to control the smart phone camera flash for functions unrelated to the camera, such as providing strobe lighting or a flashlight feature. While useful for seeing in the dark, these applications cannot be used to transmit optical data from the smart phone.

The remote control device described herein utilizes various software applications that function to control a light source (e.g., a camera flash or display screen backlight) of a smart phone, or other device, for the purpose of sending and/or receiving optical data to/from a variety of controlled devices using visible light. Different software applications can be used to control different devices. The software applications described herein can be downloaded (e.g., from the Internet) or otherwise stored onto a memory medium of the remote control device, and generally consist of program instructions that may be executed by a processor of the remote control device to effectuate visible light communication between the remote control device and one or more controlled devices.

Turning now to the drawings, FIG. 1 depicts one example of a remote control system 10 that uses the flash and camera of a smart phone 11 to control a light fixture 12 and other devices using visible light. In the particular embodiment depicted in FIG. 1, remote control system 10 comprises smart phone 11, light fixture (or lamp) 12, and thermostat 13 in room 15. Thermostat 13 connects to the HVAC system 14 though wire 20.

In the exemplary embodiment of FIG. 1, smart phone 11 modulates the light 16 produced by the flash to transmit optical data through free space to lamp 12 and thermostat 13. Lamp 12 and thermostat 13 can respond to messages from smart phone 11 through modulated light 18 and 19, respectively. Modulated light 18 and 19 is recorded and decoded by smart phone 11 using its camera in this example. Lamp 12 can also repeat messages that are communicated through modulated light 17 to extend the communication range of messages sent from smart phone 11 to other devices, which may be too far away or out of the line of sight of smart phone 11, such as thermostat 13, or additional lamps or devices (not shown).

FIG. 1 is just one example of many possible remote control systems 10. For instance, smart phone 11 can control substantially any type of controlled device having a light sensor, and optionally, a light emitter. Examples of possible controlled devices include, but are not limited to, security systems, ceiling fans, televisions, home appliances, and a wide variety of other types of electronic devices. It is also noted that the remote control device does not have to be a smart phone, and the light source on the remote control device does not have to be a flash. In general, the remote control device described herein may be substantially any type of electronic device having at least a camera and a light source. As an example, a laptop computer, a desktop computer, a hand-held unit, or a wall-mounted unit could operate as a remote control device, for example, by modulating the backlight of a display screen (or other light source) for the purpose of transmitting optical data to a lamp or other type of remotely controlled device.

The remote control system 10 is not limited to the embodiment specifically illustrated in FIG. 1. For example, smart phone 11 could simply control one or more lamps 12 in remote control system 10 and may not communicate at all with thermostat 13. In the example of FIG. 1, lamp 12 repeats messages from smart phone 11 once (via modulated light 17) to extend the optical range of smart phone 11. However, any number of lamps (or other type of controlled device with a light emitter) can retransmit messages any number of times to provide virtually unlimited communication range. Such lamps or devices can retransmit in synchronization with each other, and optionally with smart phone 11, to amplify the optical signal communicated through free space using visible light. When communicating in synchronization, the optical signal grows in intensity with each repetition as additional devices join the retransmission.

Although visible light communication is preferred, smart phone 11 could also communicate using Wi-Fi, Bluetooth, or any other communication protocol with a controlled device comprising such communication protocol interface and a light emitter, such as an LED. In this embodiment, a controlled device may convert Wi-Fi messages, for example, to optically-modulated signals, which are transmitted to and detected by other controlled devices in the system 10.

Figure 2:
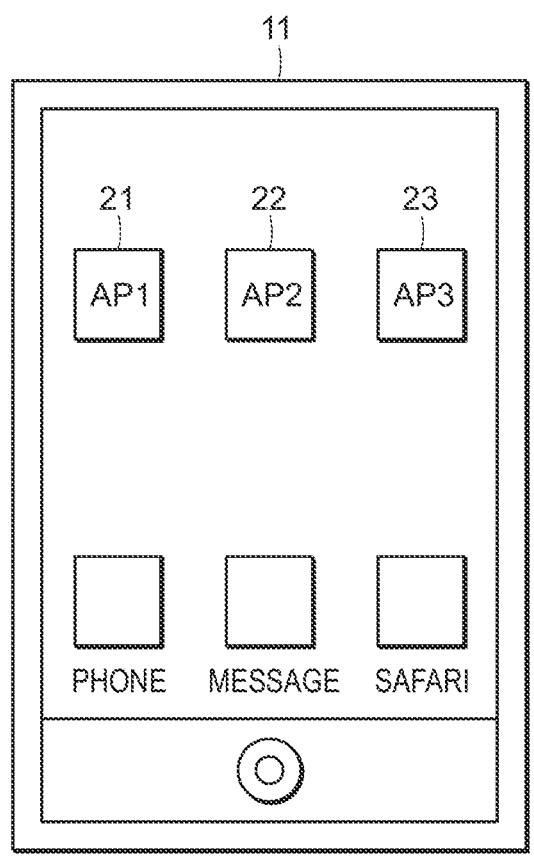
FIG. 2 is an exemplary illustration of a remote control device (e.g., a smart phone) displaying icons for remote control applications.

FIG. 2 is an exemplary illustration of smart phone 11 with a touch screen display showing graphical user interface icons, for example, corresponding to three different remote control applications 21, 22, and 23. In this example, applications 21, 22, and 23 can be provided by the smart phone manufacturer, or downloaded by smart phone 11 via the Internet, and appear as icons on the display. As known in the art, a user may touch one of the icons shown on the display screen to open a corresponding application and invoke the program instructions associated therewith. In the exemplary embodiments shown in FIGS. 1-4, applications 21 and 22 respectively control the lamp(s) 12 and thermostat 13 in remote control system 10. It is noted, however, that applications 21, 22, and 23 are merely illustrations depicting essentially any type and any number of applications that may be used by a smart phone (or other type of electronic device) for controlling any type and any number of controlled devices.

Figure 3:
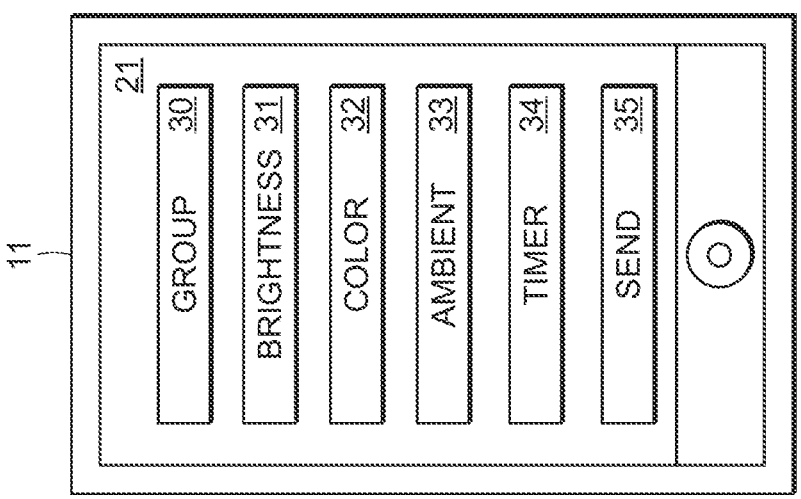
FIG. 3 is an exemplary illustration of a remote control device (e.g., a smart phone) displaying a remote controlled lighting application.

FIG. 3 is an exemplary illustration of smart phone 11 displaying one embodiment of a remotely controlled lighting application 21, which comprises sliders or buttons 30, 31, 32, 33, 34 and 35. In this example, group button 30 may be divided into many smaller buttons that enable different groups of lights to be controlled independently. Brightness slider 31 in this example can be adjusted to control the dimming level of a lamp 12, a group of lamps, or all lamps within communication range of the system 10.

Color button 32 could be a set of buttons, a slider, or even a two-dimensional region to adjust the color of a lamp 12. A set of buttons could allow preset color points or Correlated Color Temperatures (CCTs) to be selected, such as 2700 K, 3000 K, 3500 K, and 5000 K. A slider could allow a user to adjust the CCT of lamp 12 anywhere within a certain range. A two-dimensional region could enable a user to select any color within the gamut provided by lamp 12.

Ambient button 33 could also be a set of buttons or a slider, for instance, which could be used to adjust the relationship between brightness and ambient light level. In one example, ambient button or slider 33 could be used to adjust the ambient light above which lamp 12 would dim or turn off. The ambient light level could be a limit or threshold above which lamp 12 is fully on, and below which lamp 12 is fully off. On the other hand, lamp 12 could gradually adjust brightness as the ambient light level changes. Lamp 12 may implement hysteresis in the case that lamp 12 turns fully on and off with ambient light level.

Timer 34 could be a set of buttons, a slider, or even a link to a more extensive sub-menu to control when lamp 12 turns on and off. For example, timer 34 could enable a user to configure lamp 12 to turn on at a certain time of day and turn off at another time. As another example, timer 34 could enable a user to adjust the amount of time that lamp 12 stays on after being turned on. As such, timer 34 represents a wide range of functionality associated with any timers in lamp 12.

Send button 35 can initiate the message transmission from smart phone 11 to adjust any of the properties or functions provided by buttons 31, 32, 33, and 34. For example, a user could first push a button within group 30 to select a particular group of lamps, adjust the position of brightness slider 31, and finally touch the send button 35 to adjust the brightness of the lamps within the selected group. However, send button 35 illustrates just one way to initiate the transmission of a message from smart phone 11 to lamp 12. As another example, any time a button or slider is adjusted, a message can be sent to a controlled device (such as lamp 12). As another example, a message can be sent to a controlled device in response to a voice communication or any other type of input to smart phone 11. In another example, a software program running on the smart phone, or on another device connected to the smart phone, may automatically send messages to one or more of the controlled devices based on sensor output (e.g., ambient light detection), scheduling, or some other factor. In general, any input can result in the smart phone 11, or other electronic devices, transmitting a message optically to lamp 12 or device 13, for instance.

The functionality illustrated in FIG. 3 provides an example of common functions that lighting application 21 might control through the execution of program instructions stored within a memory of the smart phone 11. Many other functions and user interfaces are possible with different sliders, buttons, and other means to control and monitor a lighting system. Other functions could include color calibration in which the camera in smart phone 11 is used to determine the color point of the light produced by a lamp 12. Smart phone 11 could then provide feedback to lamp 12 to adjust the color to a desired point. Likewise, other sensors and interfaces on smart phone 11 could be used to monitor other aspects of the light output from a lamp 12 and provide feedback.

Figure 4:
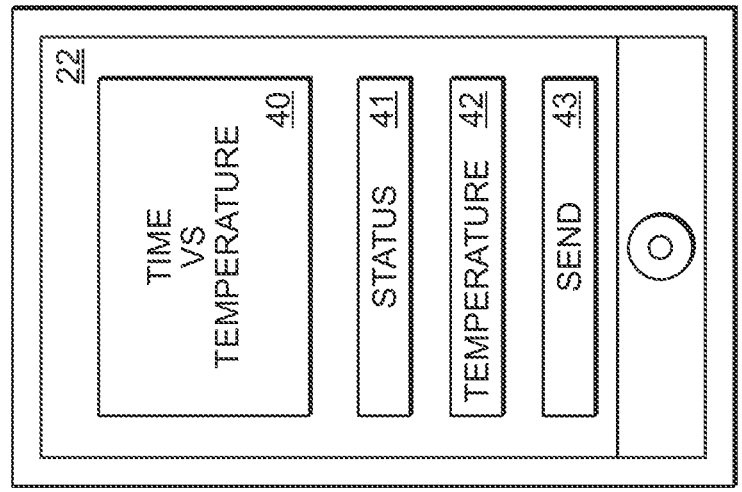
FIG. 4 is an exemplary illustration of a remote control device (e.g., a smart phone) displaying a remote controlled HVAC application.

FIG. 4 is an exemplary illustration of smart phone 11 displaying one embodiment of a remotely controlled thermostat application 22, which comprises graphical user interface fields 40, 41, 42, and 43. Time-versus-temperature field 40 could comprise buttons, sliders, or a link to a sub-menu, or could comprise a two-dimensional mapping of time of day versus temperature that can be adjusted by a user via touch. Status field 41 could be a region of the display that reports HVAC status (such as heating, cooling, or fan) and current temperature, for instance. Temperature field 42 could comprise a slider that enables a user to adjust the temperature continually over a range of temperatures. Send button 43 could operate the same or differently from the send button 35 shown in FIG. 3.

FIG. 3 and FIG. 4 are illustrations of possible software applications that may be used for controlling lights and thermostats using visible light communication from a smart phone or other remote control device. However, a wide variety of application programs and user interfaces are possible. Additionally, applications for controlling a wide variety of controlled devices are also possible. Although visible light communication is the preferred communication method, some applications may communicate using Wi-Fi or any other protocol to a controlled device that accepts such protocol but produces messages using modulated light.

Figure 5:
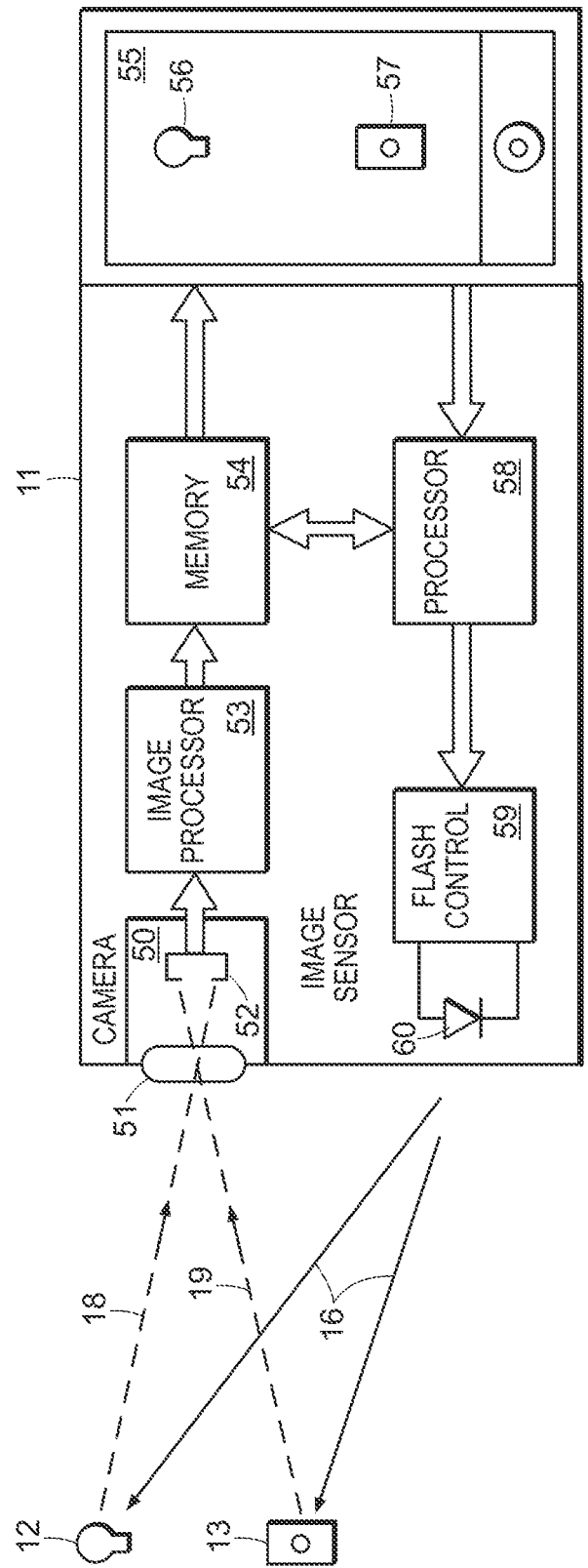
FIG. 5 is an exemplary block diagram of a remote control device (e.g., a smart phone), according to one embodiment.

FIG. 5 is an example block diagram of a smart phone 11 that uses visible light communication to control lamp 12 and thermostat 13. Smart phone 11 comprises touch screen display 55 for displaying a graphical user interface associated with software applications 21 and 22, for instance, and for optionally displaying images of devices to be controlled or monitored. The software applications 21 and 22 may be downloaded (e.g., from the Internet) or otherwise stored within a memory medium of smart phone 11, such as memory 54 depicted in FIG. 5. The software applications 21 and 22 may be invoked, e.g., when a user touches an icon (not shown) displayed on the touch screen display 55. Once invoked, the software applications 21 and 22 may be executed on a processor of smart phone 11, such as processor 58.

In addition to running applications 21 and 22, processor 58 receives user input through the touch screen display 55 and passes data to be transmitted to the camera flash controller 59. In some cases, the data sent from processor 58 to camera flash controller 59 may include a communication message, which is to be transmitted optically via controller 59 and LED 60 to one or more controlled devices. In general, the communication message may include a plurality of data fields as shown, e.g., in FIG. 8 and described in more detail below. In some cases, the communication message may include a repeat field specifying the number of times the communication message should be repeated or retransmitted by a controlled device that receives the communication message. Upon receiving the communication message, the camera flash controller 59 transmits optically-modulated data by turning LED 60 on and off in response to the data sent from processor 58. In some cases, the optically-modulated data may be produced in accordance with a well-known encoding scheme, such as the bi-phase encoding scheme shown in FIG. 9.

In the example shown in FIG. 5, modulated light 16 from LED 60 is transmitted to lamp 12 and thermostat 13. Lamp 12 and thermostat 13 respond with modulated light 18 and 19, respectively. Camera 50, which comprises lens 51 and image sensor 52, measures the light produced by lamp 12 and thermostat 13 as a function of time. Optional image processor 53 can compensate for non-idealities, among other things, and store a video recording of lamp 12 and/or thermostat 13 in memory 54. Processor 53 or processor 58 can analyze the video recording to determine the location of light sources on the controlled devices, which can include lamp 12 and/or thermostat 13, and can analyze the change in light output over time to determine the data being sent from such devices. After analyzing the video recording, processors 53 or 58 can report the response to the touch screen display 55, pass the data to another program running on another computer, or store the data in memory 54, for example.

Since smart phone 11 uses camera 50 to receive data, the smart phone 11 can receive data from many controlled devices at the same time. In some cases, smart phone 11 can display a still image from the video recording that identifies the location of the controlled devices (e.g., lamp 12 and thermostat 13) from which smart phone 11 received valid responses. A user can then touch an image 56 of lamp 12 or an image 57 of thermostat 57 to select that device for further communication.

FIG. 5 is just one block diagram depicting exemplary components and functionality that may be provided by smart phone 11. Smart phone 11 may be configured differently in alternative embodiments. For instance, smart phone 11 could transmit optical data by modulating the light from the backlight of the display screen (instead of the flash 60), or could use an optional ambient light sensor to receive optical data (instead of the camera image sensor 52). Camera 50 could comprise different internal components, such as the optional image processor 53. Processor 58 and memory 54 could reside in the same integrated circuit or different ones. Smart phone 11 could communicate with many lamps or groups of lamps instead of just lamp 12. Smart phone 11 could also communicate with many different types of controlled devices instead of just lamp 12 and thermostat 13. In general, smart phone 11 may communicate simultaneously with substantially any number and any type of device within the field of view of camera 50.

Smart phone 11 could also communicate, for example, using Wi-Fi or another communication protocol to a controlled device having the same protocol interface and an optical emitter. The controlled device could convert received Wi-Fi messages to optical messages, and smart phone 11 could use camera 50 to receive responses optically from the controlled devices.

Figure 6:
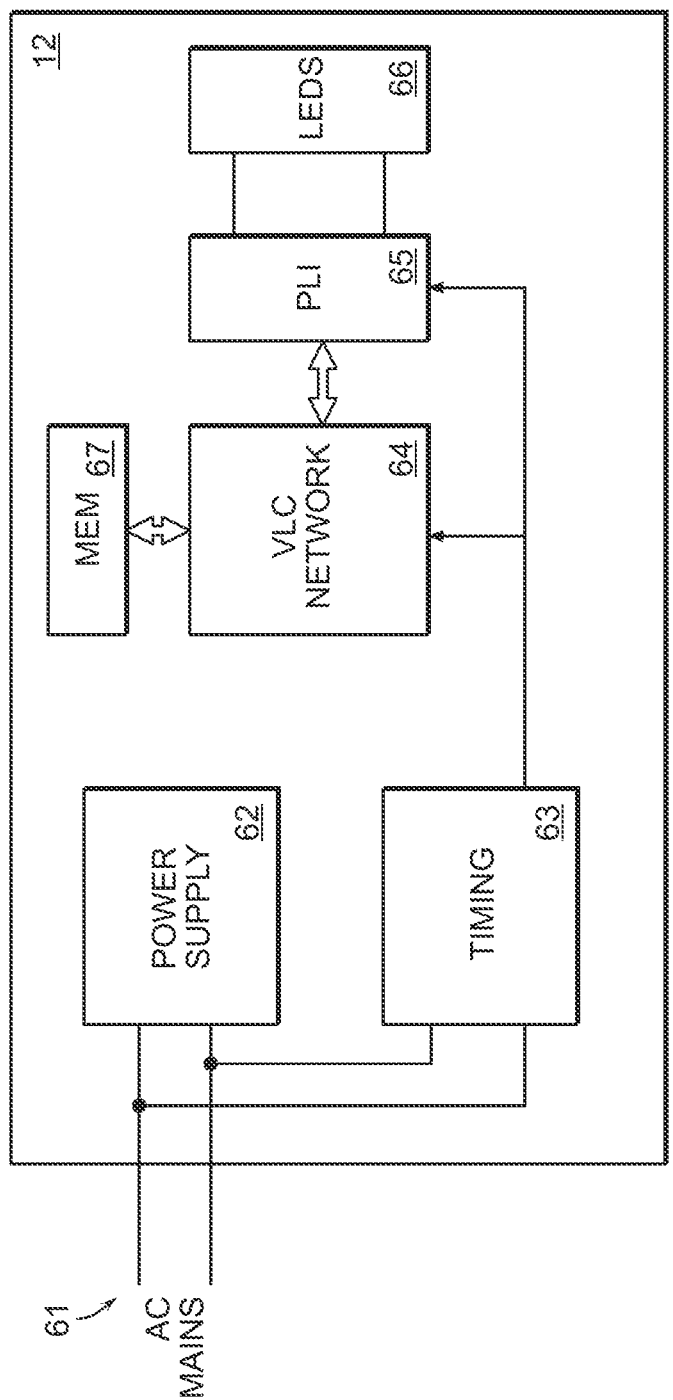
FIG. 6 is an exemplary block diagram of a controlled device, according to one embodiment.

FIG. 6 is one example of a block diagram for lamp 12, which is connected to AC mains 61 and comprises power supply 62, timing 63, VLC network controller 64, physical layer interface (PLI) 65, LEDs 66, and memory 67. Power supply 62 converts the AC power from AC mains 61 to DC power, which provides current to the LEDs 66 and voltage to the remaining circuitry in lamp 12. Timing 63 typically comprises a phase-locked loop (PLL) that locks to the AC signal provided by AC mains 61 and provides timing information to visible light communication (VLC) network controller 64 and physical layer interface (PLI) 65. The timing information provided by timing 63 can be used to synchronize all lamps 12 and other devices in the system 10, and in some cases, may also be used to time power supply 62 to minimize noise coupling into PLI 65.

PLI 65 typically comprises an LED driver circuit that produces substantially DC current to produce illumination from LEDs 66 and modulated current to transmit optical data from LEDs 66. The AC and DC currents provided by the LED driver circuit can be combined in many ways to produce illumination and transmit data using the same light source. For example, periodic time slots can be produced in synchronization with the AC mains 61 during which the DC current is turned off and the AC current is turned on to transmit optical data within the periodic time slots or communication gaps.

PLI 65 also typically comprises a receiver circuit that detects current induced in LEDs 66 when the LEDs 66 receive optical data transmitted using visible light through free space. The receiver circuit included within PLI 65 converts the photo-current induced in LEDs 66 to voltage, which is then compared to a reference voltage to determine a sequence of ones and zeros sent by the transmitting device.

VLC network controller 64 interfaces with PLI 65 and memory 67 to receive optical data transmitted from a transmitting device using visible light through free space, to implement the functionality of lamp 12, and in some cases, to re-transmit the received optical data during communication gap times. The optical data received by LEDs 66 can be interpreted by VLC network controller 64, stored in memory 67, and/or further processed. For instance, the brightness or color of LEDs 66 can be adjusted by adjusting the substantially DC current applied to LEDs 66 using the LED driver circuit included within PLI 65. Optical data intended for other or additional electronic devices (such as thermostat 13) can be stored in memory 67 and re-transmitted by PLI 65 and LEDs 66 in various ways.

The block diagram illustrated in FIG. 6 is just one example of many possible lamps 12, which are configured to receive optical data communicated through free space and re-transmit the received optical data to other electronic devices using visible light. In some embodiments, the configuration of lamp 12 may be substantially different from the example shown in FIG. 6. For instance, lamp 12 could be DC or solar powered, and thus, may not be connected to AC mains 61. Although LEDs 66 are preferred, since they can be used as both a light source and light detector, any type of light source may be included within lamp 12 including, but not limited to, fluorescent tubes, compact fluorescent lights, incandescent light, etc. If an alternative light source is used, lamp 12 may comprise an additional light detector, such as a silicon photo-diode, for receiving the optically-transmitted data.

Figure 7:
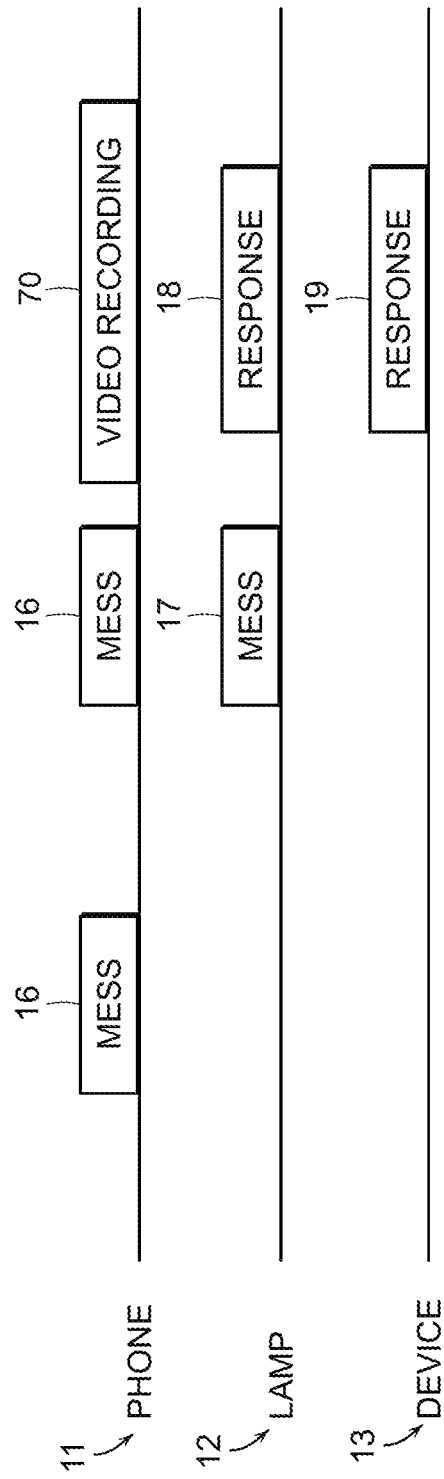
FIG. 7 is an exemplary timing diagram of communication between a remote control device (e.g., a smart phone) and a plurality of controlled devices.

FIG. 7 illustrates an exemplary timing diagram for the visible light communication illustrated in FIG. 1 between smart phone 11, lamp 12, and thermostat device 13. In the exemplary timing diagram of FIG. 7, smart phone 11 transmits a communication message 16 to lamp 12 through free space using visible light. The communication message 16 may be temporarily stored, e.g., within memory 67 of lamp 12 (as shown in FIG. 6). In the case that the thermostat 13 is too far away or out of the line of sight of smart phone 11, lamp 12 may retransmit communication message 16 once (as communication message 17) to extend the range of communication between smart phone 11 and thermostat 13. Lamp 12 and thermostat 13 transmit responses 18 and 19, respectively, which may be saved in smart phone 11 as video recording 70.

As shown in FIG. 7, smart phone 11 may send communication message 16 twice, with the second time being in synchronization with the same communication message 17 being sent from lamp 12. Upon receiving the first communication message 16 from the smart phone 11, the lamp 12 may adjust its bit timing to that of the first received message 16, and retransmit the message (as communication message 17) in synchronization with the second communication message 16 being transmitted by the smart phone.

As described in more detail below, communication messages 16 and 17 may each comprise a repeat field (81, FIG. 8) that specifies the number of times the message is to be repeated. In the example of FIG. 7, the content of the repeat field is '1' during the first transmission of communication message 16 from smart phone 11. In this example, lamp 12 receives message 16 the first time it is transmitted; however, thermostat 13 is out of communication range and does not receive the message 16 transmitted from smart phone 11. Both smart phone 11 and lamp 12 decrement the repeat field and retransmit the communication message 16, 17. In the example of FIG. 7, message 16 and message 17 are the same, with the exception that message 16 is transmitted by smart phone 11 and message 17 is transmitted by lamp 12. Since message 17 and message 16 are the same, and since they are transmitted in synchronization, the optical power is increased, and the range of the optical signal is extended. This enables thermostat 13 to receive the second transmission of the message 17 even though the thermostat 13 may be out of communication range of smart phone 11.

In addition to a repeat field, communication messages 16 and 17 may further comprise an address field (82, FIG. 8) that can specify broadcast, group cast, or unicast messages. Broadcast messages target all devices, group cast messages target groups of devices, and unicast messages target individual devices within signal range. In the example of FIG. 7, communication messages 16 and 17 are broadcast to all devices, to which both lamp 12 and thermostat 13 respond with responses 18 and 19, respectively. Smart phone 11 records a video 70 of the responses 18 and 19 from lamp 12 and thermostat 13 and decodes the data from the modulated optical power detected by the pixels of image sensor 52. In some cases, smart phone 11 can display an image from video recording 70 to enable a user to select a particular device for subsequent communication, for example, by touching display 55 in the region of the particular device in the image (see, e.g., FIG. 5).

As set forth below, communication messages 16 and 17 may further comprise a command field (83, FIG. 8) that specifies the action to be taken by an addressed device or devices. One command, which is typically broadcast or group cast, instructs all targeted devices to respond with a random number. When this communication is transmitted, smart phone 11 records the responses within the field of view of camera 50 and recovers the random number transmitted from each device. A user of smart phone 11 can then select a particular device from the image displayed on touch screen display 55 for subsequent communication, which may use the random number as the address (82, FIG. 8) for unicast communication with the selected device. Such a mechanism is useful, among other things, for setting an individual or group address for each lamp or device when commissioning a new lighting system, for instance.

FIG. 7 represents just one of many possible timing diagrams for visible light communication between smart phone 11, lamp 12, and thermostat 13. In some cases, smart phone 11 may send communication message 16 only once, instead of the two times shown in FIG. 7. In this case, the devices being controlled by smart phone 11 (e.g., lamps 12 and possibly thermostat 13) may be synchronized to something other than the bit timing of the first communication message 16. In one embodiment, the controlled devices may be coupled to a common power source, such as the AC mains of a building, and may be synchronized to a common timing reference generated from the AC power source. In such an embodiment, the controlled devices may include a phase-locked loop (PLL) for generating the common timing reference by locking onto the AC signal provided by the AC power source. By synchronizing the timing of the controlled devices to a common timing reference, the controlled devices can receive and retransmit communication messages to other controlled devices in synchronization with each other. This eliminates any need for the controlled devices to be synchronized to a remote control device.

Alternative remote control systems 10 having possibly many different types and/or numbers of controlled devices may operate in accordance with substantially different communication timing diagrams. For instance, communication messages may not be repeated at all, or may be repeated many times. In some cases, communication messages may target individual devices in which only one controlled device may produce a response. In some cases, no responses may be provided. In other cases, responses from controlled devices may be repeated by other controlled devices to extend the communication range of responses sent from the controlled devices back to the smart phone 11. Further, smart phone 11, or any other type of device that initiates optical communication, may not have, or make use of, a camera 50, and consequently, may not record video 70.

Figure 8:
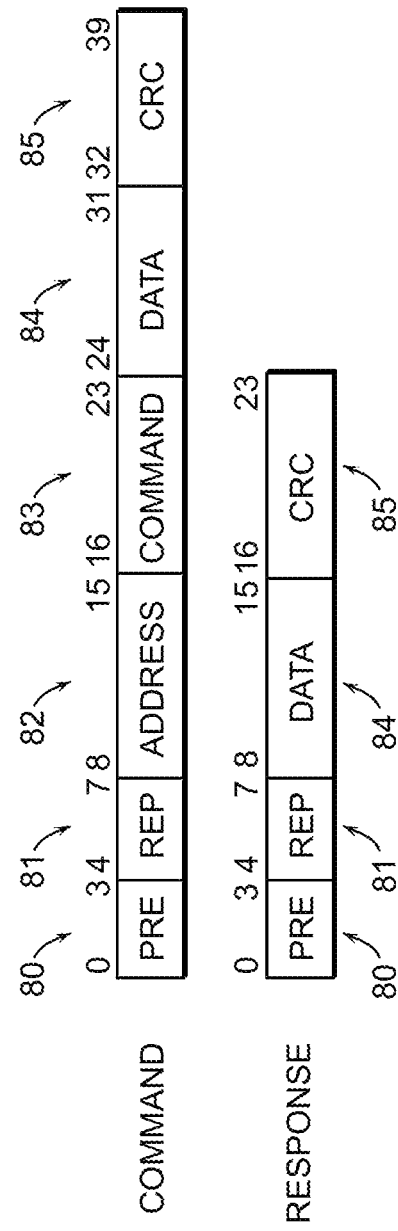
FIG. 8 is an exemplary diagram of a message structure for a communication sent from a remote control device and a response sent from a controlled device.

FIG. 8 illustrates an exemplary remote control message structure for messages 16 and 17 and responses 18 and 19. In the illustrated embodiment, communication messages 16 and 17 comprise preamble field 80, repeat field 81, address field 82, command field 83, data field 84, and CRC checksum 85. In the example of FIG. 8, the preamble field 80 comprises bits 0 through 3, the repeat field 81 comprises bits 4 through 7, the address field 82 comprises bits 8 through 15, the command field 83 comprises bits 16 through 23, the data field 84 comprises bits 24 through 31, and the CRC checksum 85 comprises bits 32 through 39.

The preamble field 80 identifies the start of communication message 16, 17 or response 18, 19 and comprises a unique data sequence or pattern that does not exist within the rest of the message or response. For instance, preamble 80 may include a coding violation (e.g., as used in bi-phase coding) or a control symbol (as used, e.g., in 4b5b or 8b10b coding). Receiving devices, such as lamp 12 and thermostat 13, identify the start of a message 16, 17 when the unique pattern in preamble 80 is detected. In some embodiments, receiving devices may also synchronize their internal timing to the bit timing of preamble 80, which enables devices without accurate timing references (e.g., PLLs) to communicate effectively.

The repeat field 81 instructs a receiving device to retransmit a received communication message 16 by specifying the number of times the message 16 is to be repeated by the receiving devices. In the example of FIG. 8, the repeat field 81 comprises four bits, which enables message 16 to be repeated up to 15 times. In some applications, all controlled devices that receive message 16 with a non-zero repeat field may decrement the value in the repeat field and retransmit message 16 in synchronization with other devices including smart phone 11. In some applications, all devices except smart phone 11 may repeat messages 16. In some applications, only some types of devices may repeat messages. The mechanism for repeating and amplifying the optical power of messages is available and can be used in many ways.

The address field 82 specifies the controlled device or devices targeted by the communication message 16. In some cases, address field 82 may include one particular code, for instance 0xFF, to indicate a broadcast message to be transmitted to all devices. In other cases, address field 82 may include a range of codes that identify a group of devices to target. For instance, the four most significant bits (8 through 11) being high can indicate a group cast message with the four least significant bits (12 through 15) indicating one of sixteen different groups of devices. In this example, all remaining codes could identify unicast messages to individual devices. Further, a certain range of unicast codes could be allocated for random number addressing as described previously, with another range of unicast codes allocated for pre-programmed addresses.

The command field 83 specifies the action to be taken by the target device or devices. Such commands and associated actions can be different for different types of devices. For instance, lamp 12 may interpret the command field 83 to perform the functions shown in application 21, while thermostat 13 may interpret the command field 83 to perform the functions shown in application 22. Some codes within the command field 83 can be reserved for system 10 management and interpreted the same by all devices. For instance, the code to respond with a random number that can be used for subsequent addressing could be the same for all devices independent of function. Other system management codes may be included to support a variety of functions.

The data field 84 may contain information associated with each command field 83 code. For instance, the code to adjust the brightness of a lamp may include a data code value within data field 84 to indicate what the brightness should be. As another example, the code to adjust the color temperature of a lamp may include a data code value within data field 84 to indicate the desired CCT. Some command field 83 codes may have no data field 84 code associated therewith. For instance, the code to turn off a lamp may not need any data information, and consequently, the data field 84 may not be included with such command codes.

The CRC checksum field 85 contains a code that is determined by the sequence of data bits between the preamble 80 and the CRC checksum field 85 and is typically used by a receiving device for error checking. CRC codes are well known in the industry and can be implemented with a variety of polynomials. Both transmitting and receiving devices generate the CRC code using the same polynomial and the same seed value. A transmitting device sends the CRC code in the CRC checksum field 85 of a message. When the message is received, a receiving device generates its own CRC code and compares the result to the code in the CRC checksum field 85 of the received message. If the codes match, the message was received properly. If the codes do not match, an error occurred, and the message can be ignored.

In general, the seed value used to generate CRC codes can be substantially any value, provided that the same seed value is used in both the transmitting and receiving devices. To allow devices from different manufacturers to be independently addressed, different manufacturers can program unique seed values into their devices, which in turn can be stored within smart phone 11 for use in communications with those devices. The use of unique seed values enables the smart phone 11 applications to selectively communicate with only a specific manufacturer's devices and to ignore messages that may be transmitted from a different manufacturer's device. For example, since the seed values are different for different manufacturers, a CRC code generated in a transmitting device from one manufacturer will not match the CRC code generated in a receiving device from another manufacturer. Consequently, all messages received by the receiving device from the transmitting device will produce errors and be ignored by the receiving device.

In order to allow some applications 21, 22, and 23 to communicate with all manufacturer's devices, all devices used in the system 10, including those made by different manufacturers, can be configured to generate two different CRC codes using two different seed values when receiving messages. One seed value can be manufacturer specific, and the other seed value can be the same for all manufacturers. If either of the generated CRC codes matches the value in the CRC checksum field 85 in the received message, an error is not generated, and the message is properly processed by the receiving device.

In some cases, the message structure of responses 18, 19 may be like the message structure of communication messages 16, 17. As shown in FIG. 8, for example, responses 18 and 19 may include a preamble field 80, a repeat field 81, a data field 84, and a CRC checksum field 85. Just as messages 16 and 17 can be repeated on transmission, so can responses 18 and 19. The repeat field 81 specifies the number of times a response is to be repeated. The data field 84 provides the device's response, or the information requested in the received message 16 or 17, to smart phone 11 for instance. For example, in response to a broadcast message 16 requesting such information, a device may include a random number or unique manufacturer ID within the data field 84 of response 18 or 19. As described above, the random number or unique manufacturer ID provided by the device within the data field 84 may be used for subsequent unicast messages between the smart phone 11 and the device. As noted above, the CRC checksum field 85 in the response 18 or 19 can be generated using any seed value, but typically would be generated using the seed value from the received message 16, 17.

FIG. 8 illustrates one of many possible message structures for communication messages 16, 17 and responses 18, 19; however, other message and/or response formats may be used. For instance, the size and/or order of any of the fields shown in FIG. 8 may be different. Further, other fields can be added or some fields, such as the data field 84, may not be used. As such, FIG. 8 is just one exemplary message structure.

Figure 9:
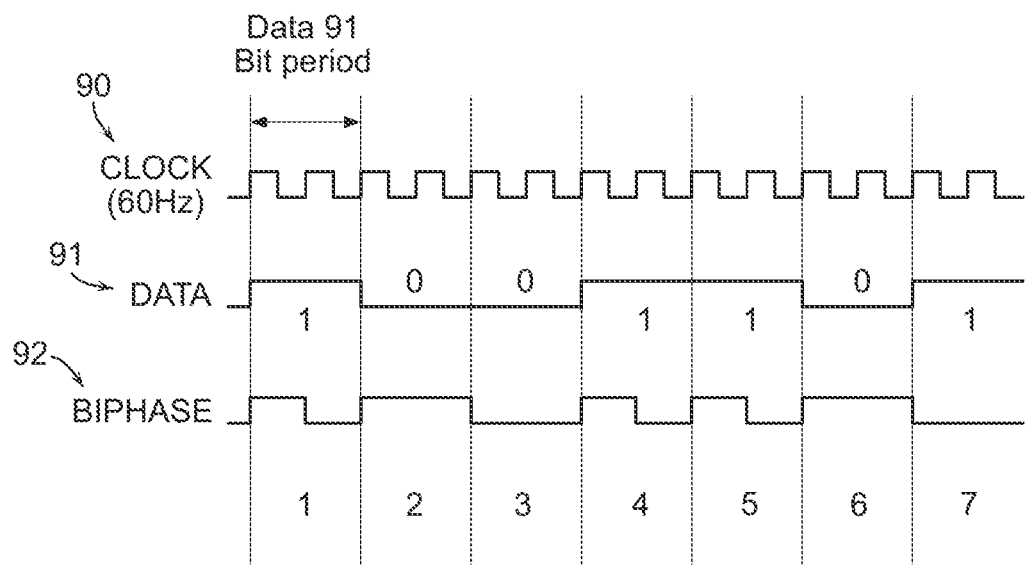
FIG. 9 is a timing diagram of an exemplary message encoding scheme.

FIG. 9 illustrates an example coding scheme for communication messages and responses, which is a well-known bi-phase coding scheme operating at 60 baud. The LED 60 of common smart phones, such as Apple's iPhone 4, can be modulated at a frequency up to 60 times per second. This 60 Hz rate is indicated by clock 90 in FIG. 9. To transmit data 91 bits from smart phone 11, the data 91 bits are first bi-phase encoded at the 60 Hz rate to produce bi-phase-encoded bits 92. The bi-phase-encoded data 92 transitions at the end of each data 91 bit period, and further transitions in the middle of a data 91 bit period when data 91 is high. As such, the data 91 bit rate in this example is 30 bits per second.

In the example of FIG. 9, LED 60 produces light when bi-phase encoded bits 92 are high (data 91 bit periods 1, 4, 5, and 7), and does not produce light when bi-phase encoded bits 92 are low (data 91 bit periods 2, 3, and 6). As such, the light produced by the LED flash 60 of smart phone 11 is modulated with bi-phase encoded data 92 at 60 baud, which produces a data 91 throughput of 30 bits per second.

Bi-phase coding is just one of many possible coding schemes that may be used for communicating communication messages 16, 17 and responses 18, 19. For example, a commonly known 4b5b and 8b10b coding scheme could be used, instead of bi-phase coding, or data 91 could be communicated without any encoding. Further, LED 60 could be modulated faster or slower than 60 Hz, which increases or decreases data 91 throughput. As such, FIG. 9 is just one example of a data communication protocol that may be used in the remote control visible light communication system 10.

Figure 10:
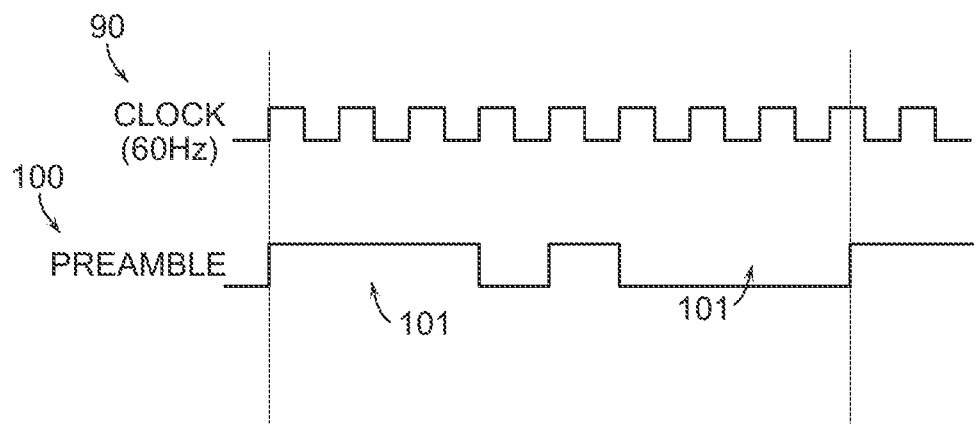
FIG. 10 is a timing diagram of an exemplary message preamble.

FIG. 10 illustrates an example preamble 100 code that may be included within the preamble field 80 in communication messages 16, 17 and responses 18, 19. Clock 90 illustrates one exemplary rate at which LED 60 can be controlled. In this example FIG. 10, preamble 100 comprises emitted light for three clock 90 cycles, no light for one clock 90 cycle, light for one clock 90 cycle, and no light for three clock 90 cycles. Since bi-phase encoded data 91 transitions every two clock 90 cycles, preamble 100 contains two coding violations 101 that only occur in the preamble field 80 of messages 16, 17 and responses 18, 19. Preamble 100 comprises the longest light pulses, three clock 90 cycles, and the shortest light pulses, one clock 90 cycles, which enables a receiving node to properly synchronize to the timing of a transmitting device.

FIG. 10 illustrates just one of many possible preamble 100 data that may be included within the preamble field 80 of messages 16, 17 and responses 18, 19. For the bi-phase encoding example, many other preamble 100 data—with or without coding violations—are possible. In addition, the preamble 100 data can be shorter or longer than shown in FIG. 10. If messages are encoded using other encoding schemes, such as 4b5b or 8b10b, preamble 100 can be significantly different. In such coding schemes, preamble 100 can be a control symbol that is not used for encoding data 91.

Figure 11:
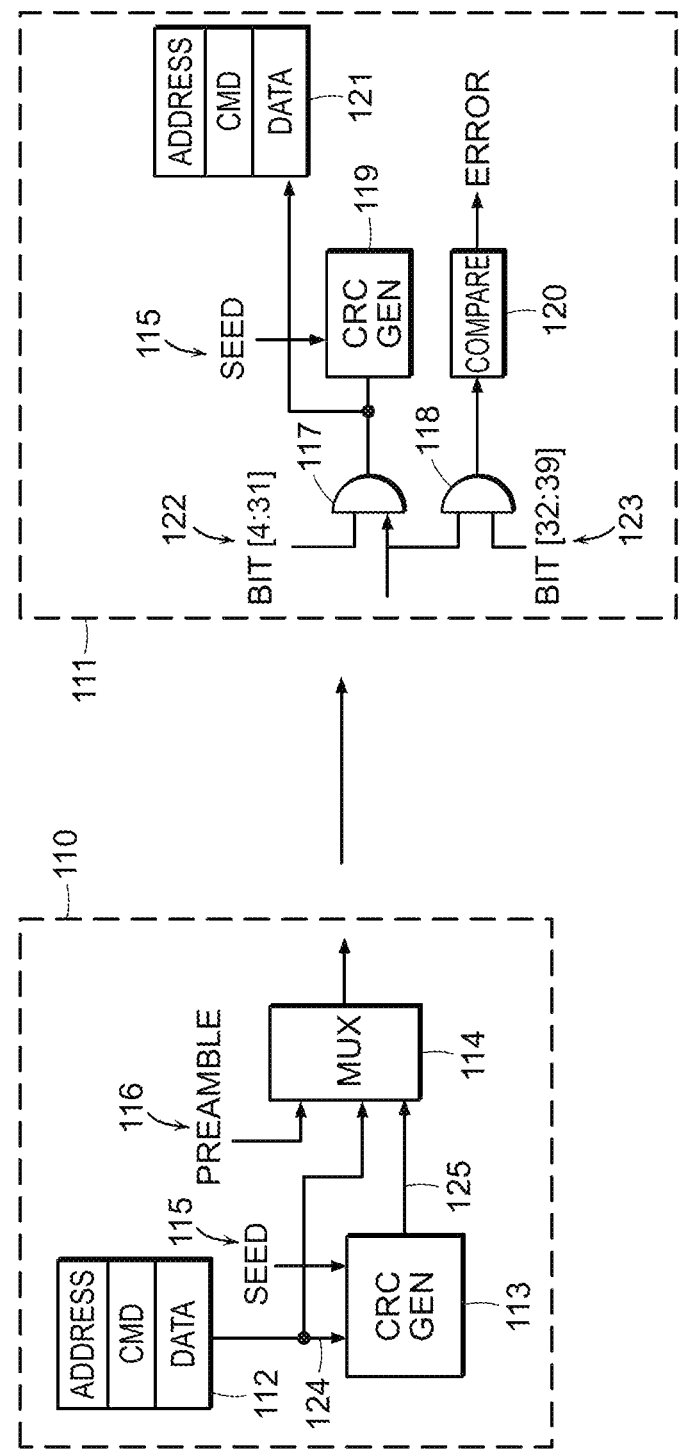
FIG. 11 is an exemplary block diagram of a CRC encoder and decoder.

FIG. 11 illustrates an example block diagram for CRC generation and checking in transmitting 110 and receiving 111 devices, respectively. In transmitting device 110, the data for the repeat 81, address 82, communication 83, and data 84 fields resides in memory 112. This data is passed, along with preamble 116 and the CRC code generated by CRC generator 113, to multiplexer 114 for generating a communication message or response. The data is also serially applied to CRC generator 113 through input port 124. Seed value 115 provides the initial state of CRC generator 113 and can be substantially any value. In some cases, seed value 115 may include a manufacturer-specific code used to provide communication only with that manufacturer's devices, or a general code that provides communication with all manufacturers' devices. The resulting CRC code produced by CRC generator 113 is passed through output port 125 and inserted by multiplexer 114 at the end of the communication message or response. Although not shown in FIG. 11 for the sake of brevity, the output of multiplexer 114 is typically encoded before being used to modulate the light produced by LED 60 in smart phone 11, for instance.

In receiving device 111, encoded data is recovered from the received light and applied to AND gates 117 and 118. Message 16 bits 4 through 31, which comprise the repeat 81, address 82, communication 83, and data 84 fields, pass through AND gate 117 to memory 121 and CRC generator 119. Message bits 32 through 39 pass through AND gate 118 to comparator 120. Seed value 115 is also applied to CRC generator 119, which produces a checksum that is compared by comparator 120 to the CRC code contained within the CRC field 85 of the received message. If the generated and received codes match, no error is detected, and the received message is accepted. If the codes do not match, an error is detected, and the message can be ignored.

To support both manufacturer-specific seed 115 values and general seed 115 values, CRC generator 119 can produce two different checksums using both seed 115 values. If either resulting checksum from CRC generator 119 matches the CRC code contained within the CRC field 85 of the received message, no error is detected, and the message is accepted.

FIG. 11 is just one of many possible block diagrams for CRC generation and checking in transmitting 110 and receiving 111 devices. The functionality illustrated in the block diagrams can be performed in hardware, software, or a combination of hardware and software, and can be implemented in many ways. FIG. 11 is intended to be representative of basic functionality and is not restricted to any particular components or configuration.

Figure 12:
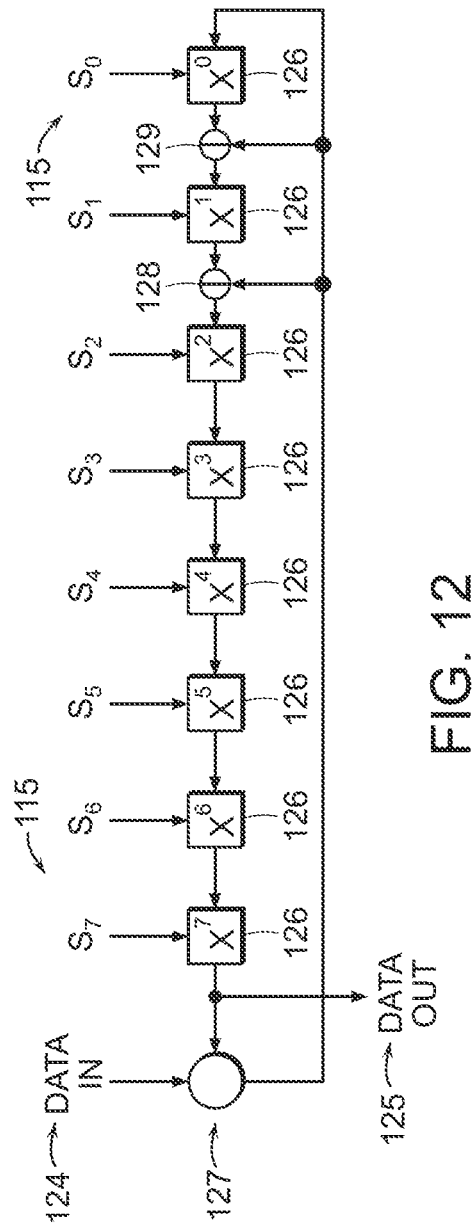
FIG. 12 is an exemplary circuit diagram to generate CRC codes.

FIG. 12 is an exemplary diagram illustrating one embodiment of how the CRC generators 113, 119 shown in FIG. 11 may be implemented. As shown in FIG. 12, the CRC generator may include a data input port 124 and a CRC code output port 125. In the example embodiment of FIG. 12, CRC generator 113, 119 uses the polynomial $XA8+X+1$ to produce the resulting CRC code. In this example, exclusive OR gates 127, 128, and 129 produce the terms $XA8$, $X$, and $1$ respectively, while data serially shifts through register bits 126. Seed value 115 provides the initial state for register bits 126 and is loaded into register bits 126 through inputs S0 through S1.

FIG. 12 illustrates just one of many possible block diagrams for implementing CRC generator 113, 119. The functionality illustrated in the CRC generator block diagram can be implemented in hardware, software, or a combination of hardware and software. FIG. 12 is intended to be representative of basic functionality and is not restricted to any particular components or configuration.

Figure 13:
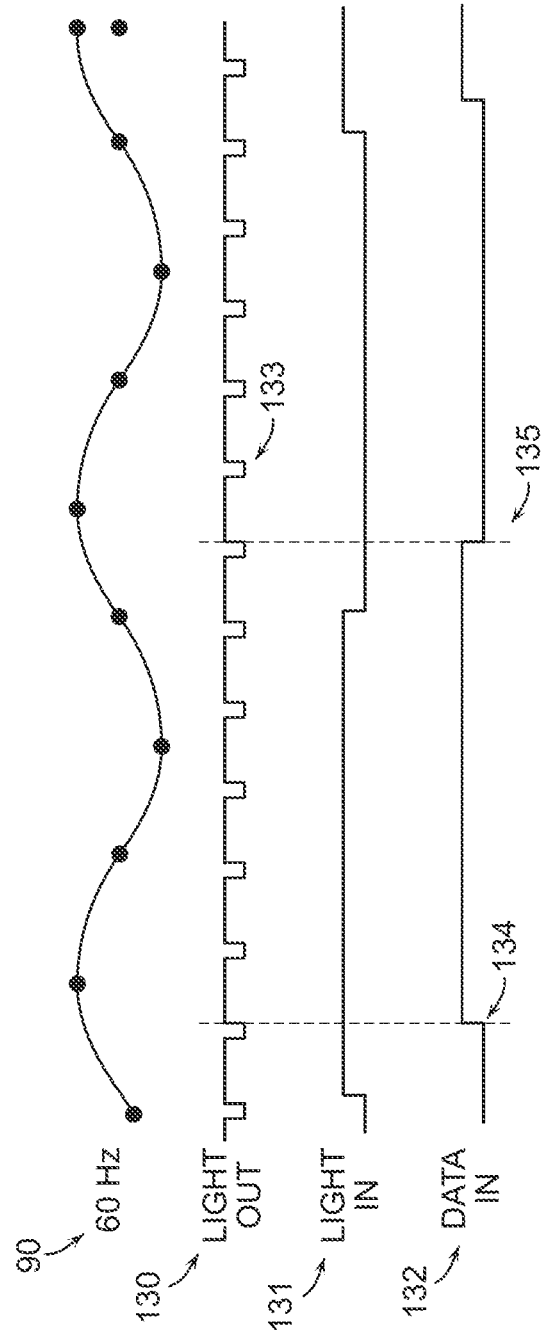
FIG. 13 is an exemplary timing diagram for a controlled device receiving a remote control message.

FIG. 13 illustrates an exemplary timing diagram for a lamp 12 receiving a communication message 16. In the example of FIG. 13, lamp 12 is connected to AC mains 61, the voltage of which is represented by 60 Hz AC signal 90. Referring to FIGS. 6 and 13, the timing block 63 included within lamp 12 phase locks to the 60 Hz AC signal from AC mains 61 and produces repetitive communication gaps 133 in the LIGHT OUT 130 from lamp 12. In the exemplary timing diagram of FIG. 13, the communication gaps 133 occur at six times the AC mains 61 frequency, or approximately 360 Hz. Between communication gaps 133, LEDs 66 can operate as light emitters. During communication gaps 133, however, no light is produced, and LEDs 66 can operate as light detectors for receiving communication messages 16 via LIGHT IN 131 and DATA IN 132.

During communication gaps 133, for example, the LIGHT IN 131 into the lamp 12 is measured and passed to PLI 65 (FIG. 6), which filters successive light measurements and produces the DATA IN 132 signal. In the illustrated example, prior LIGHT IN 131 transitions are detected at the end of the next communication gap 133 at times 134 and 135. Although smart phone 11 may have a precise 60 Hz reference clock and lamp 12 may be locked to the precise 60 Hz reference clock of the AC mains 61, the phase of the two 60 Hz reference clocks may be unknown. This is illustrated by the phase difference between LIGHT IN 131 and DATA IN 132.

FIG. 14 illustrates an exemplary timing diagram for a lamp 12 transmitting a message 17 relative to the AC mains timing signal 90. The DATA OUT signal 140 represents data bits of a message 17 to be transmitted by lamp 12. LIGHT OUT 141 represents the light produced by lamp 12, which in this example is modulated by DATA OUT 140. Although FIG. 14 indicates that LIGHT OUT 141 from lamp 12 is turned completely on and off, the LIGHT OUT 141 from lamp 12 can be modulated between any two brightness levels, some of which may be observed as flicker, and others that may not be.

The rate of DATA OUT 140 is illustrated in FIG. 14 to be 30 bits per second, or one bit for every two cycles of the 60 Hz reference clock 90 of the AC mains 61, which can be readily detected by a camera 50 operating at a 60 Hz frame rate. If camera 50 in smart phone 11 operates substantially faster than 60 Hz, the rate of DATA OUT 140 can be even higher. Likewise, if lamp 12 is communicating with other lamps or devices with other optical detectors, the rate of DATA OUT 140 can also be higher. As such, FIG. 14 is an example of just one possible timing diagram for transmitting a message via lamp 12.

FIG. 15 illustrates an alternative method for transmitting messages 17 from a lamp 12 in which only the LIGHT OUT 141 produced by lamp 12 during the communication gaps 133 is modulated by DATA OUT 140. In this example, other lamps 12 or devices locked to the AC signal of the AC mains 61 can detect such light modulation and properly receive the DATA OUT 140 signal.

FIG. 16 illustrates an example timing diagram of camera 50 and a pixel within image sensor 52 of a smart phone 11 receiving a response 18, 19. In this example, the VIDEO CLOCK 160 within camera 50 is operating at a 60 Hz frame rate. The light into the pixel through the lens 51 from a lamp 12, for instance, varies as illustrated by LIGHT IN 161. LIGHT IN 161 could be generated by a lamp 12 operating with the transmit timing diagram illustrated in the example of FIG. 14. In this example, the LIGHT IN 161 bit rate is half the 60 Hz frame rate and slightly out of phase with the VIDEO CLOCK 160.

During video frames 164 and 166, LIGHT IN 161 is high and low respectively for the entire frame. In this case, the pixel voltage integrates LIGHT IN 161 over the entire 60 Hz cycle and produces a maximum difference between light and dark. During frames 163 and 165, however, the LIGHT IN 161 is on part of the 60 Hz cycle and off part of the 60 Hz cycle, which results in the pixel voltage, or image brightness, to be at some intermediate level. With such timing, image processing software in image processor 53 or processor 58 of smart phone 11 can detect the modulation of light from a lamp 12 and properly receive a response 18, 19. Additional image processing may also be used to compensate for motion of the camera 50 or transmitting devices.

FIG. 16 is an illustration of possible timing and functionality of camera 50 and smart phone 11 receiving optical signals from a lamp 12 or other types of devices. PIXEL VOLTAGE 162 is intended to simply represent the relative brightness of pixels within an image as a function of time. PIXEL VOLTAGE 162 may or may not represent the actual signal in image sensor 52. Likewise, the data rate of LIGHT IN 161 may be faster or slower than the rate shown in FIG. 16. FIG. 16 is just one example.

While the invention is susceptible to various modifications and alternative forms, specific embodiments thereof are shown and described by way of example. It should be understood, however, that the drawings and detailed description thereto are not intended to limit the invention to the forms disclosed.

The invention claimed is:

1. An apparatus, comprising:
   at least one visible light output device;
   communication interface circuitry;
   physical layer interface circuitry operatively coupled to the at least one visible light output device and to the communication interface circuitry;
   timing circuitry operatively coupled to the physical layer interface circuitry;
   visible light communication (VLC) control circuitry operatively coupled to the physical layer interface circuitry and to the timing circuitry, the VLC control circuitry to:
   periodically cycle the at least one visible light output device through a plurality of sequential operating cycles, each of the plurality of sequential operating cycles including an illuminated portion and a non-illuminated portion based on a timing signal provided by the timing circuitry;
   synchronize the non-illuminated cycle portion with at least one other controlled device using the timing signal;
   generate a message responsive to receipt of a command from a remote-control device via the communication interface circuitry;
   communicate the message to the at least one other controlled device using VLC, the message communicated during the non-illuminated cycle portion of a first of the plurality of operating cycles; and
   communicate an acknowledgement message to the remote-control device responsive to receipt of the command from the remote-control device.

2. The apparatus of claim 1, wherein the communication interface circuitry includes at least one visible light input device; and
   wherein to generate the output message responsive to receipt of the command from the remote-control device, the VLC control circuitry to further:
   generate the output message responsive to receipt of the command communicated from the remote-control device using VLC.

3. The apparatus of claim 2, wherein the at least one visible light output device includes at least one light-emitting diode (LED), the at least one LED capable of producing a luminous output during the illuminated portion of each operating cycle and capable of producing an output signal representative of a level of received incident illumination during the non-illuminated portion of each operating cycle.

4. The apparatus of claim 1, wherein the controlled device further comprises memory circuitry communicatively coupled to the VLC control circuitry; and
wherein to communicate the message to the at least one other controlled device during the non-illuminated portion of the first of the plurality of operating cycles, the VLC control circuitry to further:
store the received command in the memory circuitry; and
communicate the message to the at least one other controlled device via VLC during the non-illuminated portion of a second of the plurality of operating cycles.

5. The apparatus of claim 1, wherein the communication interface circuitry includes radio frequency (RF) communication interface circuitry; and
wherein to generate the message responsive to receipt of the command from the remote-control device, the VLC control circuitry to further:
receive from the remote-control device a radio frequency signal that includes data representative of the command; and
convert the data representative of the command included in the RF signal to a VLC message.

6. The apparatus of claim 2, wherein the timing circuitry comprises phase-locked loop (PLL) circuitry synchronized to a frequency of an alternating current voltage supply to the apparatus.

7. The apparatus of claim 1, wherein to communicate the acknowledgement message to the remote-control device, the VLC control circuitry to further:
receive, during a non-illuminated portion of a first of the plurality of operating cycles, a VLC acknowledgement message from the at least one other controlled device;
convert the received VLC acknowledgement message to an RF acknowledgement message; and
communicate, via the communication interface circuitry, the RF acknowledgement message to the remote-control device.

8. The apparatus of claim 2, wherein to communicate the acknowledgement message to the remote-control device, the VLC control circuitry to further:
receive, during a non-illuminated portion of a first of the plurality of operating cycles, a VLC acknowledgement message from the at least one other controlled device; and
communicate, during a non-illuminated portion of a second of the plurality of operating cycles, the received VLC acknowledgement message to the remote-control device.

9. A visible light communication (VLC) controller to provide VLC communication capabilities in a controlled device, the controller comprising:
processor circuitry to:
periodically cycle at least one visible light output device through a plurality of sequential operating cycles, each of the plurality of sequential operating cycles including an illuminated portion and a non-illuminated portion based on a timing signal provided by timing circuitry;
synchronize the non-illuminated cycle portion with one or more other VLC controllers using the timing signal;
generate a message responsive to receipt of a command from a remote-control device via communicatively coupled interface circuitry;
communicate the message to the at least one other VLC controller using VLC, the message communicated during the non-illuminated cycle portion of a first of the plurality of operating cycles; and
communicate an acknowledgement message to the remote-control device responsive to receipt of the command from the remote-control device.

10. The VLC controller of claim 9, wherein to communicate the message to the at least one other VLC controller during the non-illuminated portion of the first of the plurality of operating cycles, the processor circuitry to further:
store data representative of the received command in communicatively coupled memory circuitry; and
communicate the message to the at least one other VLC controller using VLC during the non-illuminated portion of a second of the plurality of operating cycles.

11. The VLC controller of claim 9, wherein to generate the message responsive to receipt of the command from the remote-control device, the processor circuitry to further:
receive from the remote-control device via the communicatively coupled interface circuitry, a radio frequency signal that includes data representative of the command; and
convert the data representative of the command included in the RF signal to the VLC message.

12. The VLC controller of claim 9, wherein to periodically cycle the at least one visible light output device through the plurality of sequential operating cycles based on a timing signal provided by timing circuitry, the processor circuitry to further:
periodically cycle the at least one visible light output device through the plurality of sequential operating cycles based on a timing signal provided by communicatively coupled phase-locked loop (PLL) circuitry synchronized to a frequency of an alternating current voltage supply.

13. The VLC controller of claim 9, wherein to communicate the acknowledgement message to the remote-control device, the processor circuitry to further:
receive, during a non-illuminated portion of a first of the plurality of operating cycles, data representative of a VLC acknowledgement message communicated by the at least one other VLC controller;
convert the received VLC acknowledgement message to an RF acknowledgement message; and
cause a communication, via the interface circuitry, of the RF acknowledgement message to the remote-control device.

14. The VLC controller of claim 9, wherein to communicate the acknowledgement message to the remote-control device, the processor circuitry to further:
receive, during a non-illuminated portion of a first of the plurality of operating cycles, data representative of a VLC acknowledgement message communicated by the at least one other VLC controller; and
cause a communication, during a non-illuminated portion of a second of the plurality of operating cycles, of the received VLC acknowledgement message to the remote-control device.

* * * * *